United States Patent
Tao et al.

(10) Patent No.: US 7,877,025 B2
(45) Date of Patent: Jan. 25, 2011

(54) PHASE MONITOR APPARATUS, PHASE CONTROL APPARATUS AND METHODS THEREOF FOR OPTICAL DQPSK RECEIVER

(75) Inventors: Zhenning Tao, Beijing (CN); Jens C. Rasmussen, Kawasaki (JP); Akihiko Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 11/994,649

(22) PCT Filed: Jul. 7, 2006

(86) PCT No.: PCT/JP2006/314018
§ 371 (c)(1),
(2), (4) Date: Jan. 3, 2008

(87) PCT Pub. No.: WO2007/007864
PCT Pub. Date: Jan. 18, 2007

(65) Prior Publication Data
US 2009/0034967 A1 Feb. 5, 2009

(30) Foreign Application Priority Data
Jul. 8, 2005 (CN) .................... 2005 1 0084471
Oct. 19, 2005 (JP) .................... 2005-305052

(51) Int. Cl.
*H04B 10/06* (2006.01)
*H04B 10/04* (2006.01)
(52) U.S. Cl. .............. 398/209; 398/202; 398/208; 398/212; 398/213; 398/214
(58) Field of Classification Search .......... 398/202–214
See application file for complete search history.

(56) References Cited

U.S. PATENT DOCUMENTS
5,359,412 A  10/1994  Schulz
(Continued)

FOREIGN PATENT DOCUMENTS
EP    0 967 743 A2   12/1999
(Continued)

OTHER PUBLICATIONS
R.A.Griffin, et al., "Optical Differential Quadrature Phase-Shift Key (oDQPSK) for High Capacity Optical Transmission", Proceedings of Optical Fiber Communication Conference and Exhibit, 2002. OFC2002, Mar. 17, 2002; pp. 367-368.
(Continued)

*Primary Examiner*—Ken N Vanderpuye
*Assistant Examiner*—Daniel G Dobson
(74) *Attorney, Agent, or Firm*—Staas & Halsey LLP

(57) ABSTRACT

I branch is provided with a first interferometer, a first balanced optical detector, and a first data recovery circuit. Q branch is provided with a second interferometer, a second balanced optical detector and a second data recovery circuit. In I branch, a mixer multiples input signal of the first data recovery circuit with output signal of the second recovery circuit. An averaging circuit averages output signal of the mixer. In Q branch, a mixer multiples input signal of the second data recovery circuit with output signal of the first recovery circuit. An averaging circuit averages output signal of the mixer. A first phase control apparatus controls the phase of a phase shifter comprised in the first interferometer based on the output signal of the averaging circuit. A second phase control apparatus, in the same manner, controls the phase of a phase shifter comprised in the second interferometer.

39 Claims, 12 Drawing Sheets

U.S. PATENT DOCUMENTS

| | | | |
|---|---|---|---|
| 6,396,605 B1 | 5/2002 | Heflinger et al. | |
| 7,389,055 B1 * | 6/2008 | Rickard et al. | 398/206 |
| 7,676,162 B2 * | 3/2010 | Isomura et al. | 398/212 |
| 2004/0081470 A1 | 4/2004 | Griffin | |
| 2005/0088659 A1 | 4/2005 | Schlenk et al. | |
| 2007/0292140 A1 * | 12/2007 | Terayama et al. | 398/140 |
| 2009/0196610 A1 * | 8/2009 | Isomura et al. | 398/65 |

FOREIGN PATENT DOCUMENTS

| | | |
|---|---|---|
| EP | 1 056 230 A2 | 11/2000 |
| EP | 1 335 510 A1 | 8/2003 |
| JP | 2004-516743 | 6/2004 |
| WO | WO02/51041 A2 | 6/2002 |
| WO | WO02/51041 A3 | 6/2002 |
| WO | WO03/063515 A2 | 7/2003 |

OTHER PUBLICATIONS

International Search Report (PCT/ISA/210) mailed Sep. 25, 2006 in connection with International Application PCT/JP2006/314018.

\* cited by examiner

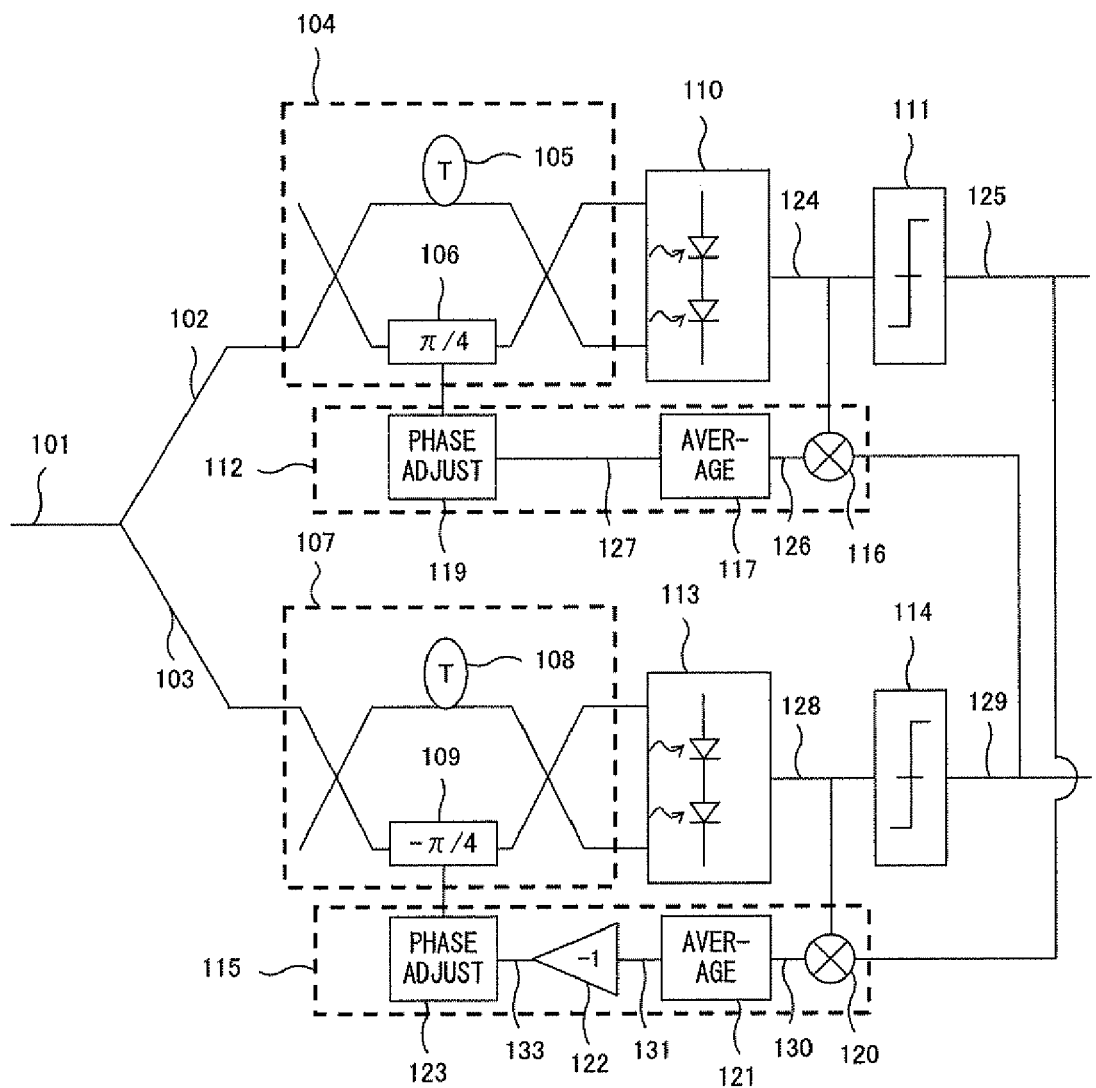
F I G. 1

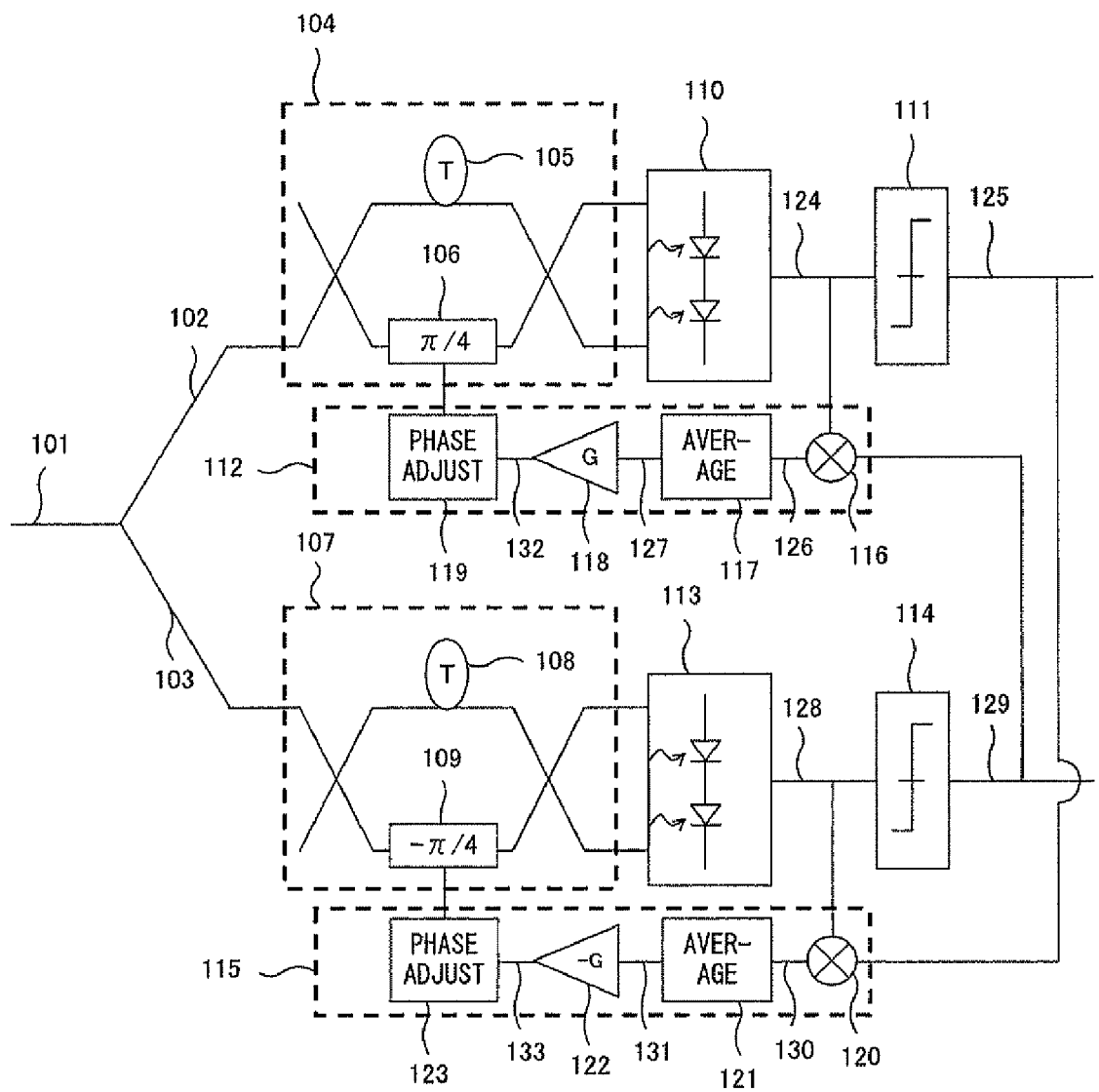
F I G. 2

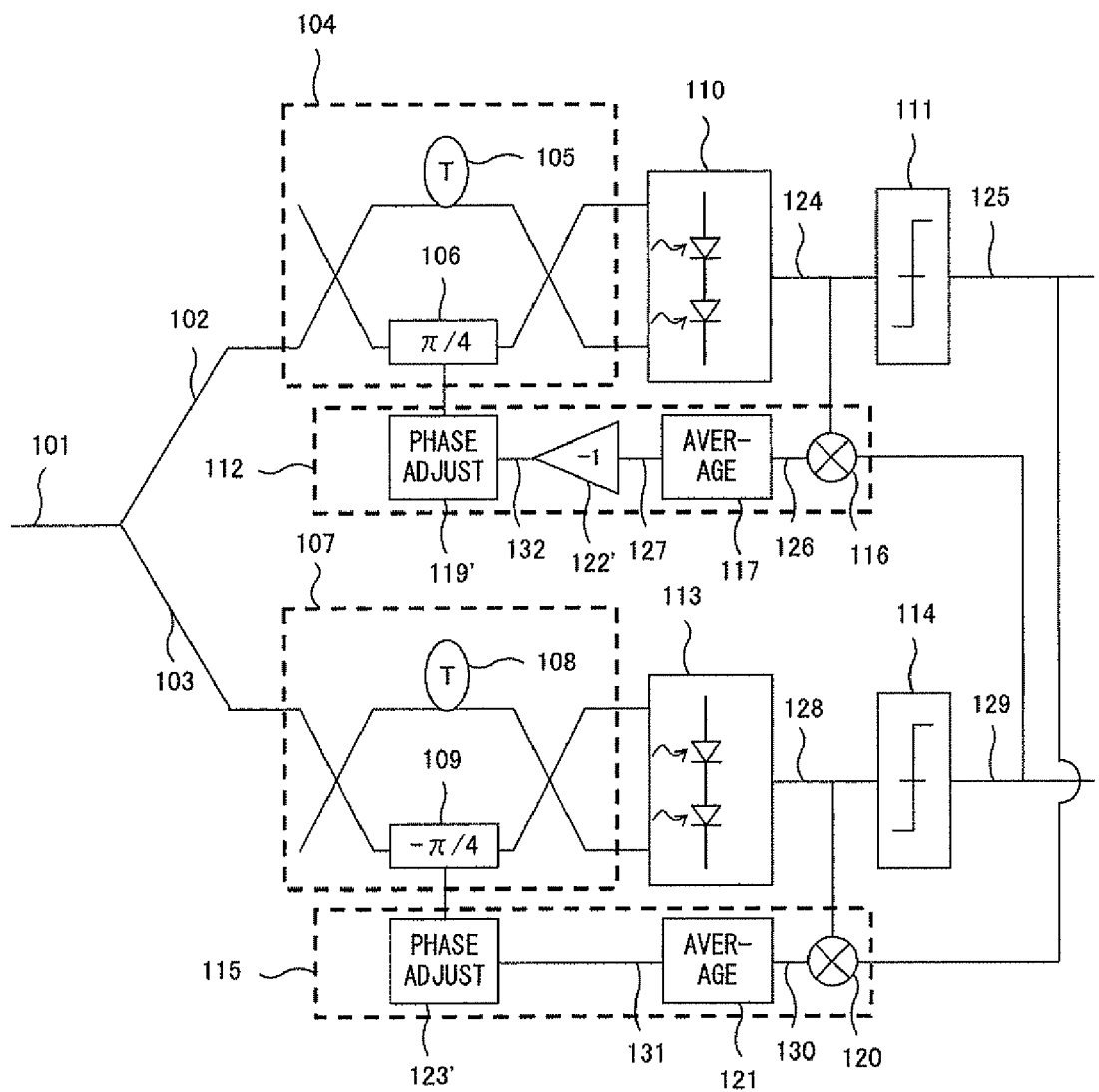
F I G. 3

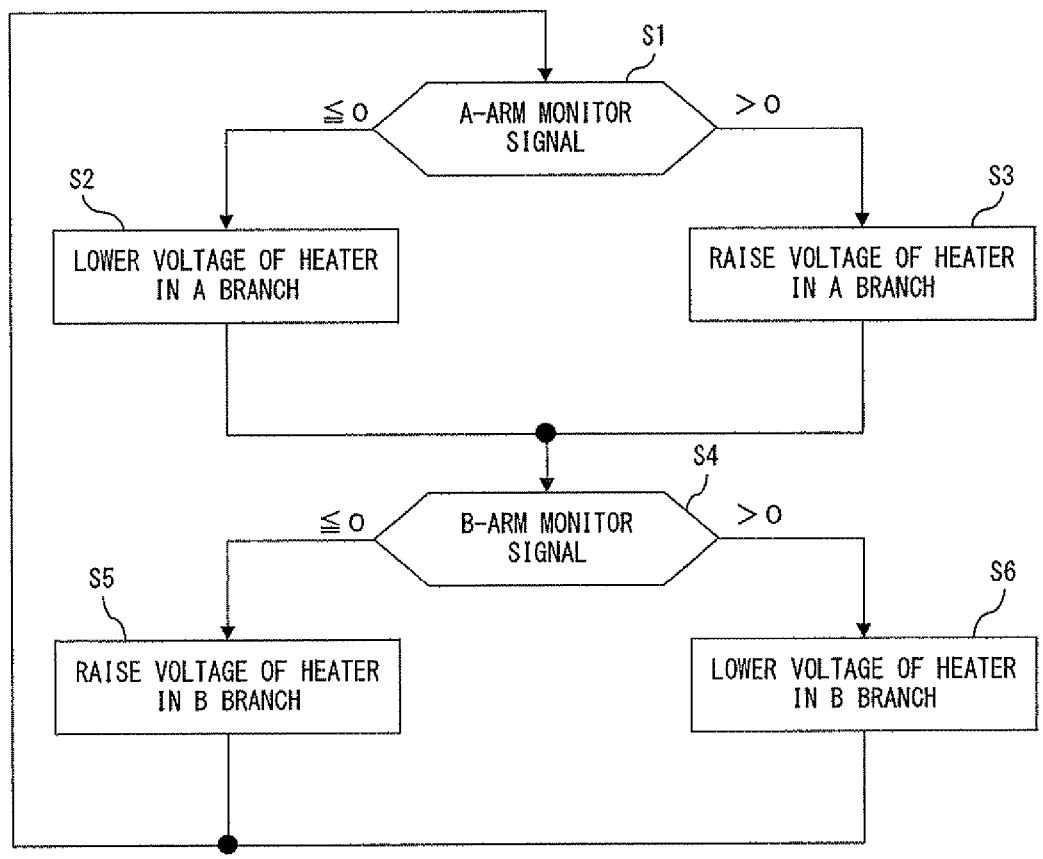
F I G. 7

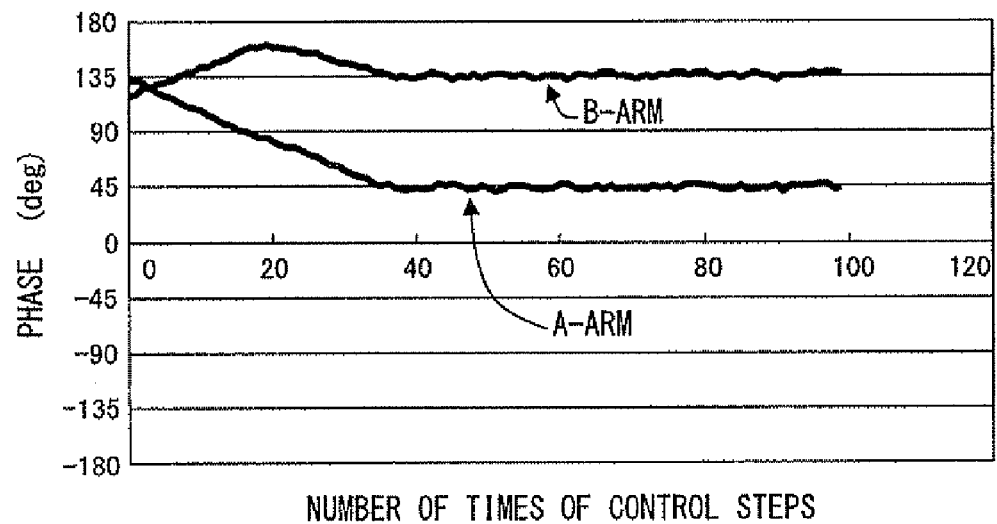
F I G. 9 A
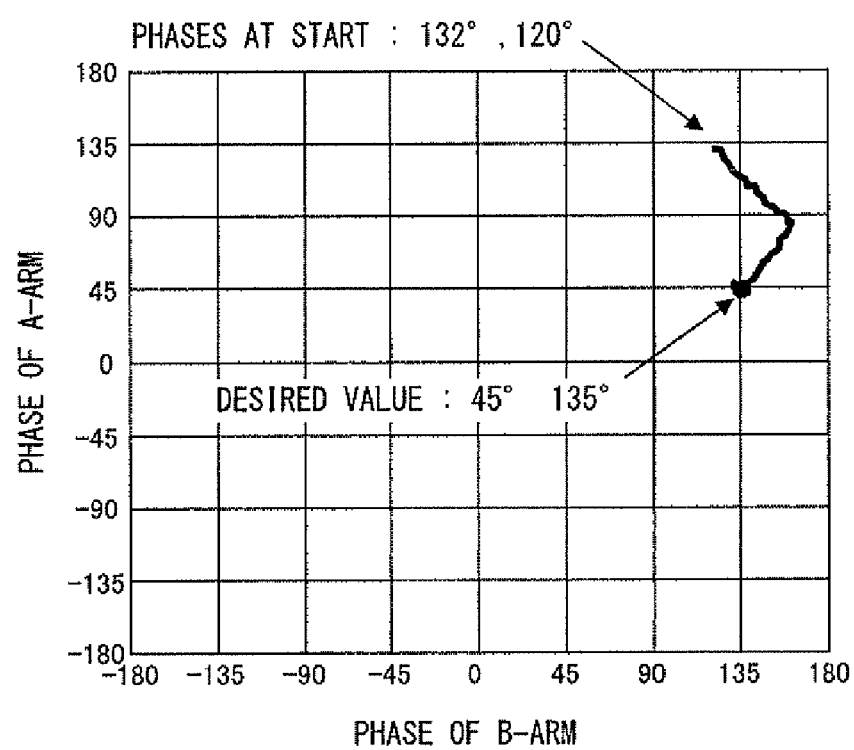
F I G. 9 B

PHASE MONITOR APPARATUS, PHASE CONTROL APPARATUS AND METHODS THEREOF FOR OPTICAL DQPSK RECEIVER

CROSS REFERENCE TO RELATED APPLICATIONS

This application claims the benefit under 35 U.S.C. Section 371, of PCT International Application Number PCT/JP2006/314018, filed Jul. 7, 2006 and Chinese Application No. 200510084471.6 filed Jul. 8, 2005 and Japanese Application No. 2005-305052 filed Oct. 19, 2005 in Japan, the contents of all of which are incorporated herein by reference.

TECHNICAL FIELD

This present invention relates to optical differential quadrature phase shift keying (optical DQPSK) receiver, more specifically, to phase monitor apparatus, phase active control apparatus and methods thereof for optical DQPSK receiver.

BACKGROUND ART

While the capacity of optical communication systems has rapidly increased over the last decade, the modulation technique employed in the majority of realizations has remained binary amplitude shift keying (also referred as on-off key (OOK)) in either nonreturn-to-zero (NPZ) or return-to-zero (RZ) format. There have been employed alternative modulation and demodulation techniques recently in optical communications, such as duobinary, carrier-suppressed return-to-zero (CSRZ), differential phase shift keying (DPSK). In DPSK format, the information is carried by phase change between two adjacent symbols. The phase change is limited to 0 and $\pi$ in binary DPSK. If the phase change can be 0, $\pi/2$, $\pi$, $3\pi/2$, it is called as differential quadrature phase shift keying (optical DQPSK). Compared with traditional OOK, DPSK has the advantage of requiring a ~3 dB optical signal-to-noise ratio (OSNR) gain and robustness to nonlinear effects. Because the optical DQPSK transmits the four-level symbol, it doubles the spectral efficiency, which relaxes the requirements of electrical device speed, optical dispersion management, polarization mode dispersion, and so on. In summary, optical DQPSK is a promising candidate for the next generation optical communication system.

As described in an article "Optical Differential Quadrature Phase-Shift Key (ODQPSK) for High Capacity Optical Transmission" by R. A. Griffin et al., OFC 2002, a typical optical DQPSK receiver consists of a pair of Mach-Zehnder interferometers, corresponding to I branch and Q branch respectively, each with an optical delay $\tau$ equal to the symbol period of transmission system. The differential optical phase between interferometer arms is set to $\pi/4$ for the I branch interferometer and $-\pi/4$ for the Q branch respectively. Two output terminals of the interferometers are connected to balanced optical detectors to recover the transmitted data. The configuration and operation of optical DQPSK Transmitter and optical DQPSK receiver are also described in, for example, PCT application WO2002/051041.

In the receiver, a very important issue is to set the differential optical phase between interferometers arms exactly $\pi/4$ and $-\pi/4$, otherwise, an excessive OSNR penalty will be caused. To realize this, a control feedback loop is typically employed. It monitors the receiver phase error, and then it generates the phase adjust signal to adjust the receiver phase so that the phase is locked to target value. One typical control feedback method is so called dither-peak-detection method. In this method, the receiver phase is slightly detuned with a fixed frequency f, while monitoring the 2 f component of some kind of error signal. When the receiver phase is locked to target value, the 2 f component of the error signal reaches minimum.

However, the dither-peak-detection method has natural drawbacks, including:

1. The phase detuning will cause excessive OSNR penalty.

2. The peaking detection only provides whether the actual phase is the target value. It cannot provide whether the actual phase is larger or less than the target value.

3. The peak detection signal is usually quadric to the phase error, so that the sensitivity of peak detection signal to the actual phase error reduces when phase error is near zero. As a result, the phase control accuracy is not high.

4. The phase control speed is limited by the dither frequency.

In view of the foregoing, there is an urgent need in the art for novel phase control technique that overcomes the aforementioned shortcomings in an effective, practical way.

SUMMARY OF THE INVENTION

With respect to the aforementioned problems in the related art, new phase control technique to solve the problems is required.

An object of the present invention is to provide a phase monitor apparatus for optical DQPSK receiver that provides not only the amplitude of the phase error, but also the sign of the phase error.

Another object of the present invention is to provide a phase control apparatus for optical DQPSK receiver that overcomes one or more problems due to the limitations and shortcomings of the related art.

A further object of the present invention is to provide an optical DQPSK receiver having the phase control apparatus provided in the present invention.

Another object of the present invention is to provide a phase monitor method for optical DQPSK receiver so that not only the amplitude of the phase error, but also the sign of the monitored phase error are monitored.

Another object of the present invention is to provide a phase control method for optical DQPSK receiver that overcomes one or more problems due to the limitations and shortcomings of the related art.

In order to attain objects mentioned above, according to one aspect of the present invention, provided is a phase monitor apparatus for optical DQPSK receiver including a first branch and a second branch, and each branch containing an interferometer, a balanced optical detector and a data recovery circuit. The phase monitor apparatus for optical DQPSK receiver is used to monitor the phase error in one of branches of said optical DQPSK receiver, said phase monitor apparatus for optical DQPSK receiver including one mixer and one averaging circuit connected in series thereto, wherein said mixer is used to mix the signal before data recovery in this branch with the signal after data recovery in the other branch and said averaging circuit is used to average the signal input from said mixer. Preferably, said averaging circuit is low pass filter or digital signal processor.

According to another aspect of the present invention, provided is a phase control apparatus for optical DQPSK receiver including a first branch and a second branch, and each branch containing an interferometer, a balanced optical detector and a data recovery circuit. The phase control apparatus for optical DQPSK receiver includes a first phase control branch and a second phase control branch corresponding to the first branch and the second branch of said optical DQPSK receiver, respectively, wherein said first phase control branch includes a first phase monitor apparatus and a first phase adjust unit connected in series, said a second phase control branch includes a second phase monitor apparatus, an inversion circuit and a second phase adjust unit connected in series, said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver, said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver, said inversion circuit is used to generate phase adjust signal based on input signal thereof, said first and said second phase adjust units are used to adjust the phase of said interferometer in corresponding branch of said optical DQPSK receiver based on input signal thereof. Preferably, said first and said second phase monitor apparatus include a mixer and an average connected in series, respectively.

Further, said averaging circuit is implemented as low pass filter, or digital signal processor in the way of averaging.

Preferably, a first branch of said optical DQPSK receiver is I branch, said second branch is Q branch, and said inversion circuit is an inverter. Said first and said second phase adjust units increase the phase of said interferometer in corresponding branch of said optical DQPSK receiver when the input signal of the phase adjust unit is positive, and reduce the phase of said interferometer in corresponding branch of said optical DQPSK receiver when the input signal of the phase adjust unit is negative.

Further, said first phase control branch includes amplifiers connected between said first phase monitor apparatus and first phase adjust unit.

Further, said second phase control branch includes amplifiers connected between said second phase monitor apparatus and second phase adjust unit.

Preferably, a first branch of said optical DQPSK receiver is Q branch, said second branch is I branch, and said inversion circuit is an inverter. Said first and said second phase adjust units increase the phase of said interferometer in corresponding branch of said optical DQPSK receiver when the input signal thereof is negative, and reduce the phase of said interferometer in corresponding branch of said optical DQPSK receiver when the input signal thereof is positive.

According to yet another aspect of the present invention, an optical DQPSK receiver is provided, having a first branch and a second branch, said first branch containing a first interferometer, a first balanced optical detector, a first data recovery circuit and a first phase control apparatus, said second branch containing a second interferometer, a second balanced detector, a second data recovery circuit and a second phase control apparatus, wherein said first phase control branch includes a first phase monitor apparatus and a first phase adjust unit connected in series, said second phase control branch includes a second phase monitor apparatus, an inversion circuit and a second phase adjust unit connected in series, said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver, said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver, said inversion circuit is used to generate phase adjust signal based on input signal thereof, and said first and second phase adjust units are used to adjust the phase of said interferometer in corresponding branch of said optical DQPSK receiver based on input signal thereof.

According to another aspect of the present invention, provided is a phase monitor method for optical DQPSK receiver having a first branch and a second branch, and each branch containing an interferometer, a balanced optical detector, and a data recovery circuit. The phase monitor method for optical DQPSK receiver is used to monitor the phase error in one of branches of optical DQPSK receiver, comprising the steps of: mixing the signal before data recovery in this branch with the signal after data recovery in the other branch; and averaging said mixed signal.

The present invention provides an optical DQPSK receiver having: a first branch and a second branch, said first branch containing a first interferometer, a first balanced optical detector, a first data recovery circuit and a first phase control apparatus, said second branch containing a second interferometer, a second balanced optical detector, a second data recovery circuit and a second phase control apparatus, wherein said first phase control branch includes a first phase monitor apparatus and a first phase adjust unit connected in series, said second phase control branch includes a second phase monitor apparatus and a second phase adjust unit connected in series, said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver, said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver, said first phase adjust unit increases the phase of said interferometer in corresponding branch of said optical DQPSK receiver when the input signal thereof is positive, and reduces the phase of said interferometer in corresponding branch of said optical DQPSK receiver when the input signal thereof is negative, said second phase adjust unit reduces the phase of said interferometer in corresponding branch of said optical DQPSK receiver when the input signal thereof is positive, and increases the phase of said interferometer in corresponding branch of said optical DQPSK receiver when the input signal thereof is negative.

Further more, the present invention provides a phase control method for optical DQPSK receiver having a first branch and a second branch, and each branch containing an interferometer, a balanced optical detector and a data recovery circuit, said method comprising the steps of: obtaining the phase error signal with a sign in the first branch of said optical DQPSK receiver based on the signal before data recovery in the first branch of said optical DQPSK receiver and the signal after data recovery in the second branch of said optical DQPSK receiver; adjusting the phase of said first branch of said optical DQPSK receiver based on phase error signal with a sign of first branch of optical DQPSK receiver; obtaining the phase error signal with a sign in the second branch of said optical DQPSK receiver based on the signal before data recovery in the second branch of said optical DQPSK receiver and the signal after data recovery in the first branch of said optical DQPSK receiver; adjusting the phase of said second branch of said optical DQPSK receiver based on the phase error signal with a sign of second branch of optical DQPSK receiver.

The present invention employs a novel phase control technique for optical DQPSK receiver, wherein the phase monitor provides not only the amplitude of the phase error, but also the sign of the phase error. This avoids the necessity of the dither-peak-detection method. Moreover, the phase monitor apparatus generates the phase error signal that proportional to the actual phase error so that the phase error signal sensitivity is still kept constant even if the phase error itself is near zero.

The phase monitor apparatus of another aspect is used for optical DQPSK receiver, said optical DQPSK receiver including a first branch and a second branch, and each branch containing a delay interferometer having a phase shift element, an optical detector detecting an optical output of the delay interferometer, and a data recovery circuit recovering data from an output signal of the optical detector, the phase monitor apparatus for monitoring an phase error of the phase shift element of the delay interferometer provided to the first branch, said phase monitor apparatus comprising: a first polarity controller controlling polarity of a first signal obtained from a previous stage of a data recovery circuit of the first branch; a second polarity controller controlling polarity of a second signal obtained from a subsequent stage of a data recovery circuit of the second branch; a mixer multiplying the first signal, the polarity of the first signal being controlled by said first polarity controller, with the second signal, the polarity of the second signal being controlled by said second polarity controller; an averaging circuit averaging an output signal of said mixer; and calculation means for calculation the phase error based on a plurality of values obtained from said averaging circuit in accordance with a combination of polarities of the first and second signals.

Thus the present invention provides one or more following advantages:

(1) By employing the novel phase error monitor, the phase dither is avoided. As a result, no excessive OSNR penalty is caused.

(2) The phase error monitor provides not only the amplitude of the phase error, but also the sign of the phase error. The sign indicates whether the phase difference is larger or smaller with respect to the desired value.

(3) The phase error control accuracy is apparently increased since the derivative of phase error signal to phase error keeps constant, so that it is ensured that the error signal sensitivity keeps constant even the error itself is small.

(4) Higher phase lock speed can be realized, since the phase control speed is no longer limited by the dither frequency.

(5) Since the DC component is removed from the phase error signal, it is possible to adjust the phase difference of a delay interferometer with high accuracy. As a result the reception quality is improved.

It is to be understood that both the foregoing general description and the following detailed description are exemplary and explanatory and are intended to provide further explanation of the invention as claimed.

BRIEF DESCRIPTION OF THE DRAWINGS

FIG. 1 shows the configuration of the optical DQPSK receiver having phase control apparatus according to the first embodiment of the present invention;

FIG. 2 shows the configuration of the optical DQPSK receiver having phase control apparatus according to the second embodiment of the present invention;

FIG. 3 shows the configuration of the optical DQPSK receiver having phase control apparatus according to the third embodiment of the present invention;

FIG. 7 is a flowchart showing phase control processing;

FIG. 9A shows a simulation result of the operation to converge the phase of the delay interferometers at a desired value;

FIG. 9B shows a simulation result of the operation to converge the phase of the delay interferometers at a desired value;

SPECIFIC EMBODIMENTS

Figure 4:
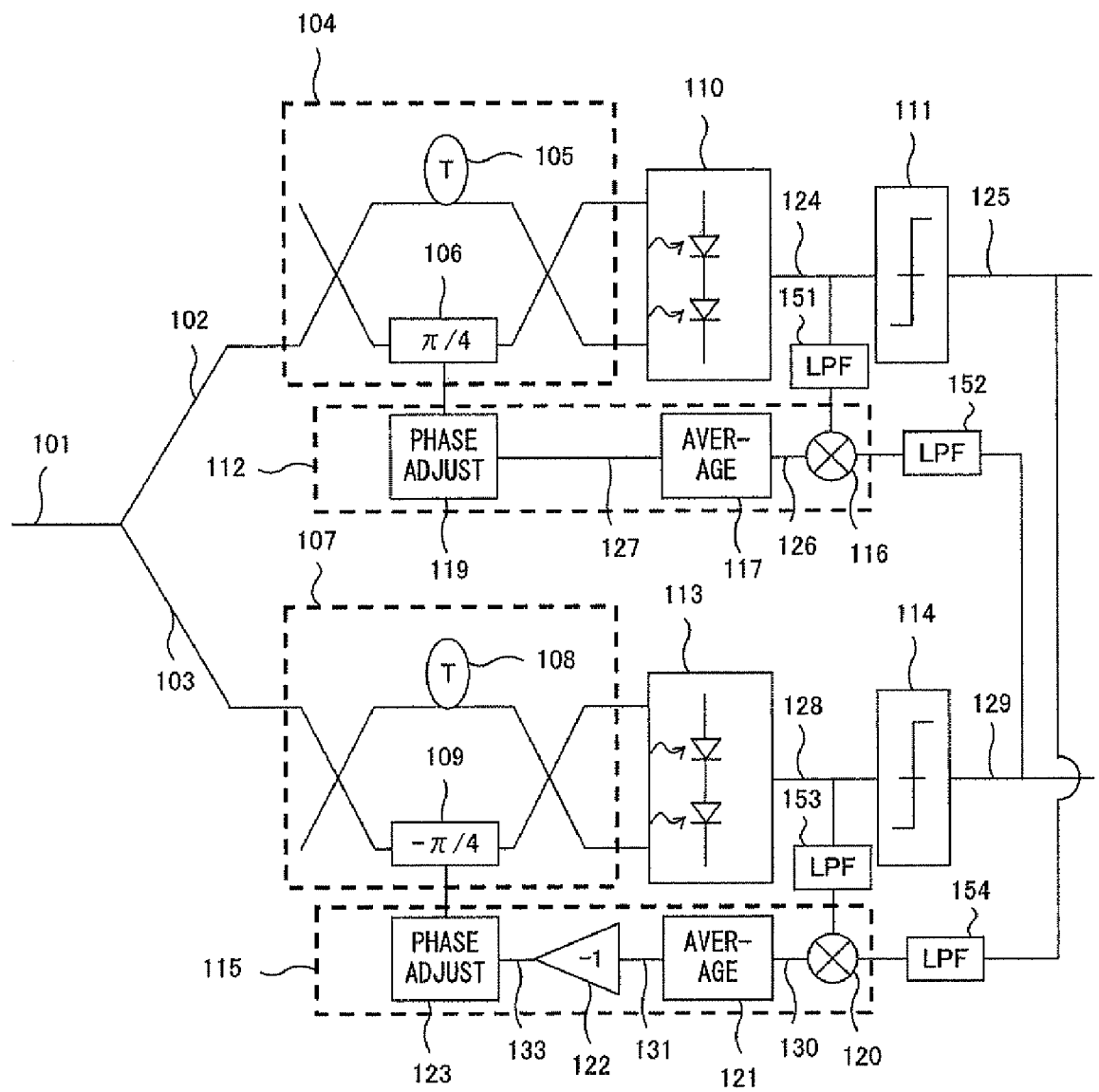
FIG. 4 shows a variation of the first embodiment.

The preferred embodiments of the present invention will be explained with reference to the accompanying drawings. In all accompanying drawings, if possible, the identical marks are used to denote the same or like parts.

First Embodiment

FIG. 1 shows the configuration of the optical DQPSK receiver having phase control apparatus according to the first embodiment of the present invention. As shown in FIG. 1, the receiver has two branches, i.e. I branch 102 and Q branch 103. I branch 102 consists a Mach-Zehnder interferometer 104, a balanced optical detector 110, a data recovery circuit 111, and a phase control apparatus 112. Q branch 103 consists a Mach-Zehnder interferometer 107, a balanced optical detector 113, a data recovery circuit 114, and a phase control apparatus 115. The upper arm of the interferometer 104/107 has an optical delay element 105/108. The duration of the delay element is the symbol period of the optical DQPSK system. The symbol period in DQPSK equals to 2 divided by bit rate. The lower arm of 104/107 has a phase shifter 106/109. In I branch, the phase of the phase shifter 106 (that is, the amount of phase shift by the phase shifter 106) should be $\pi/4$. In Q branch, the phase of the phase shifter 109 (that is, the amount of phase shift by the phase shifter 109) should be $-\pi/4$. They are the target values of the phase control apparatus.

In I branch, the input terminal of the phase control apparatus 112 is connected to the input terminal of the data recovery circuit 111 and the output terminal of the data recovery circuit 114, the output terminal of the phase control apparatus 112 is connected to the interferometer 104, more specifically to the phase shifter 106. In Q branch, the input terminal of the phase control apparatus 115 is connected to the input terminal of the data recovery circuit 114 and the output terminal of the data recovery circuit 111, the output terminal of the phase control apparatus 115 is connected to the interferometer 107, more specifically to the phase shifter 109. That is, the input signal of phase control apparatus 112 in I branch is the output signal 124 from the balanced optical detector 110 and the output signal 129 from the data recovery circuit 114, while the input signal of phase control apparatus 115 in Q branch is the output signal 128 from the balanced optical detector 113 and the output signal 125 from the data recovery circuit 111.

The interferometer, balanced optical detector and data recovery circuit of the receiver can employ the well-known devices for persons skilled in the art. The phase control apparatus of the present invention will be described in detail as follows.

As illustrated in FIG. 1, in I branch, the phase control apparatus 112 is composed of a phase monitor unit including a mixer 116 and an averaging circuit 117 in this embodiment, and a phase adjust unit 119 connected in series thereto. In Q branch, the phase control apparatus 115 is composed of a phase monitor unit including a mixer 120 and an averaging circuit 121 in this embodiment, an inversion circuit 122 and a phase adjust unit 123 connected in series. In this embodiment, the inversion circuit 122 is an inverter. The mixer is used to mix the input signals, and the averaging circuit is used to average the signals input from the mixer. They are both well-known devices in the art. For example, the mixer can be implemented as analog Mixer (such as the mixers of Spectrum Microwave Corporation) or implemented by the multiplication calculation with digital signal processor (DSP) which is after an AD converter. In other words, the mixer can implemented by an AD converter and a digital signal processor which is in series with the AD converter. The AD converter can be implemented as an AD converter of Analog Devices Corporation. The averaging circuit can use a low pass filter with which the high frequency components of the input signal are filtered out and the low frequency signals containing average information are retained so that the function of filter is realized, or be implemented by average calculation with digital signal processor (DSP), for example.

The principle of the present invention will be explained with reference to FIG. 1. As shown in FIG. 1, the modulated signal 101 of optical DQPSK can be expressed as:

$$s(t)=A(t)\exp(\phi_n)\exp(j\omega t)$$

where, $A(t)$ is the pulse shape of one symbol, $\phi_n$ is the phase of the $n^{th}$ symbol, and $\omega$ is the angular frequency of the optical carrier. The value of $\phi_n$ can be one of the following four: $\pi/4$, $3\pi/4$, $5\pi/4$, $7\pi/4$.

In optical DQPSK, the information is transmitted through the phase different between the adjacent symbols. Thus, the phase difference is one of the following four values: 0, $\pi/2$, $\pi$, $3\pi/2$.

According to the optical DQPSK receiver theory:

In I branch, the output 124 of the balanced optical detector 110 is:

$$A^2(t)\cos(\Delta\phi+\pi/4+\delta_I).$$

In Q branch, the output 128 of the balanced optical detector 113 is:

$$A^2(t)\cos(\Delta\phi-\pi/4+\delta_Q).$$

Here, $\Delta\phi$ is the phase difference between the two adjacent symbols, and $\delta_I$ is the phase error of I branch phase shifter 106, and $\delta_Q$ is the phase error of Q branch phase shifter 109.

The data recovery circuit 111 recovers the I branch data 125 by a decision with zero threshold. The recovered data 125 is $\cos(\Delta\phi+\pi/4)=-\sin(\Delta\phi-\pi/4)$. Similarly, the Q branch recovered signal 129 is $\cos(\Delta\phi-\pi/4)=\sin(\Delta\phi+\pi/4)$. These contents are publicly known.

In I branch of the present invention:

The input of the mixer 116 is signals 124 and 129. The output 126 of the mixer 116 is:

$$A^2(t)\cos(\Delta\phi+\pi/4+\delta_I)\cos(\Delta\phi-\pi/4) =$$
$$A^2(t)\cos(\Delta\phi+\pi/4+\delta_I)\sin(\Delta\phi+\pi/4) =$$
$$A^2(t)\cos(\Delta\phi+\pi/4)\sin(\Delta\phi+\pi/4)\cos(\delta_I) - A^2(t)\sin^2(\Delta\phi+\pi/4)\sin(\delta_I)$$

Since phase different $\Delta\phi$ is equally distributed among 0, $\pi/2$, $\pi$, $3\pi/2$, the first item in above equation can be removed by the averaging circuit 117. On the other hand, the second item is always $-A^2(t)\sin(\delta_I)/2$ prior to averaging, whatever phase difference $\Delta\phi$ is. Therefore, $A^2(t)$ is averaged only by the averaging circuit to some constant value independent of the transmitted information. Thus, the output 127 of the averaging circuit 117 is proportional to $-\sin(\delta_I)$. When the phase error is small, the signal 127 can be approximated by: $-\delta_I$.

Thus the phase monitor unit not only gives the amplitude of phase error, but also the sign of the phase error. Further more, the derivative of phase error signal 127 to phase error is constant, thus the phase monitor sensitivity is also constant, even phase error itself is zero.

In Q branch of the present invention:

The input of the mixer 120 is signals 125 and 128. The output 130 of the mixer 120 is:

$$A^2(t)\cos(\Delta\phi-\pi/4+\delta_Q)\cos(\Delta\phi+\pi/4) =$$
$$-A^2(t)\cos(\Delta\phi-\pi/4+\delta_Q)\sin(\Delta\phi-\pi/4) =$$
$$-A^2(t)\cos(\Delta\phi-\pi/4)\sin(\Delta\phi-\pi/4)\cos(\delta_Q) +$$
$$A^2(t)\sin^2(\Delta\phi-\pi/4)\sin(\delta_Q)$$

Since phase different $\Delta\phi$ is equally distributed among 0, $\pi/2$, $\pi$, $3\pi/2$, the first item in above equation can be removed by the averaging circuit 121. On the other hand, the second item is always $A^2(t)\sin(\delta_Q)/2$ prior to averaging, whatever phase difference $\Delta\phi$ is. Therefore, $A^2(t)$ is averaged only by the averaging circuit to some constant value independent of the transmitted information. Thus, the output 131 of the averaging circuit 121 is proportional to $\sin(\delta_Q)$. When the phase error is small, the output 131 can be approximated by: $\delta_Q$.

Thus the phase monitor unit not only gives the amplitude of phase error, but also the sign of the phase error. Further more, the derivative of phase error signal 131 to phase error is constant, thus the phase monitor sensitivity is also constant, even phase error itself is zero.

As mentioned above, the phase monitor unit of the present invention can generate the error monitor signal proportional to the phase error itself in this branch based on the signal before the data recovery in this branch (I or Q) and the signal after the data recovery in the other branch (Q or I).

After the phase monitor, the phase error signal 131 is fed into the inversion circuit 122 that is an inverter. After inversion, the phase adjust signal 133 is generated and input to phase adjust unit 123. The phase error signal 127 is directly input to phase adjust unit 119 as a phase adjust signal.

The phase adjust unit 119/123 increases the phase (the amount of phase shift of the phase shifter 106/109) of the interferometer in corresponding branch when the phase adjust signal is positive, and reduces the phase (the amount of phase shift of the phase shifter 106/109) of the interferometer in corresponding branch when the phase adjust signal is negative. The phase adjust unit does not act (that is, hold the amount of phase shift of the phase shifter 106/109) when the phase adjust signal is zero. The phase adjust unit can employ various phase adjust devices well known to persons skilled in the art, such as DPSK Demodulator of ITF Optical Technologies Corporation of Canada provides the Mach-Zehnder interferometer containing phase adjust device where the phase adjustment to interferometer can be realized by adjusting the temperature of the interferometer.

Thus, if the phase of I branch phase shifter 106 is $\pi/4+\delta_I$, which has a positive phase error $\delta_I>0$. At this time, the output 127 from the phase monitor unit is $-\delta_I<0$. The phase adjust unit 119 reduces the phase of the phase shifter since the input signal is negative. Thus, the phase turns closer to the target value $\pi/4$. If the phase shifter 106 has a negative phase error, then the output of the phase monitor unit is positive, so that the phase adjust unit increases the phase of the phase shifter. Thus, the phase also turns to the target value. If the phase error is zero, the output of the phase monitor unit is also zero. The phase adjust unit does not act. Thus, the target phase is kept.

Correspondingly, if the phase of Q branch phase shifter 109 is $-\pi/4+\delta_Q$, which has a positive phase error $\delta_Q>0$. At this time, the output 131 from the phase monitor unit is $\delta_Q$. The phase adjust signal 133 is $-\delta_Q<0$ after inversion circuit 122. The phase adjust unit 123 reduces the phase of the phase shifter since the input signal is negative. Thus, the phase turns closer to the target value $-\pi/4$. If the phase shifter 109 has a negative phase error, then the output of the phase monitor unit is negative, whereas the phase adjust signal is positive due to the inversion circuit 122, so that the phase adjust unit increases the phase of the phase shifter. Thus, the phase also turns to the target value. If the phase error is zero, the output of the phase monitor unit is also zero. The phase adjust unit does not act. Thus, the target phase is kept.

Second Embodiment

The second embodiment of the present invention will be explained with reference to FIG. 2. The second embodiment is substantially same as the first embodiment, other than non-inverting amplifier G (G>0) is connected in series between the averaging circuit 117 and phase adjust unit 119 of the phase control apparatus in I branch, and the inversion circuit 122 of the phase control apparatus in Q branch is composed of inverting amplifier -G (G>0).

In this case, if the phase of I branch phase shifter 106 is $\pi/4+\delta_I$, which has a positive phase error $\delta_I>0$. At this time, the output 127 from the phase monitor unit is $-\delta_I<0$. After the non-inverting amplifier 118, the signal is $-G\delta_I$, and still negative. The phase adjust unit 119 reduces the phase of the phase shifter since the input signal is negative. Thus, the phase turns closer to the target value $\pi/4$. If the phase shifter 106 has a negative phase error, then the output of the phase monitor unit is positive, then the input of the phase adjust unit is positive, so that the phase adjust unit increases the phase of the phase shifter. Thus, the phase also turns to the target value. If the phase error is zero, the output of the phase monitor unit is also zero. The phase adjust unit does not act. Thus, the target phase is kept.

Correspondingly, if the phase of Q branch phase shifter 109 is $-\pi/4+\delta_Q$, which has a positive phase error $\delta_Q>0$. At this time, the output 131 from the phase monitor unit is $\delta_Q$. After the inverting amplifier 122, the phase adjust signal 133 is $-G\delta_Q<0$. The phase adjust unit 123 reduces the phase of the phase shifter since the input signal is negative. Thus, the phase turns closer to the target value $-\pi/4$. If the phase shifter 109 has a negative phase error, then the output of the phase monitor unit is negative, whereas the phase adjust signal is positive due to inversion by the inverting amplifier 122, so that the phase adjust unit increases the phase of the phase shifter. Thus, the phase also turns to the target value. If the phase error is zero, the output of the phase monitor unit is also zero. The phase adjust unit does not act. Thus, the target phase is kept.

Third Embodiment

The third embodiment of the present invention will be explained with reference to FIG. 3. The third embodiment is substantially same as the first embodiment, other than an inversion circuit 122' is connected in series between the averaging circuit 117 and phase adjust unit 119 of the phase control apparatus in I branch, and the phase control apparatus in Q branch includes no inversion circuit 122. In addition, correspondingly, phase adjust unit 119'/123' reduces the phase of the phase shifter when the phase adjust signal is positive, and increases the phase of the phase shifter when the phase adjust signal is negative. If the phase adjust signal is zero, the phase adjust unit does not act.

In this case, if the phase of I branch phase shifter 106 is $\pi/4+\delta_I$, which has a positive phase error $\delta_I>0$. At this time, the output 127 from the phase monitor unit is $-\delta_I<0$, After the inversion by the inversion circuit 122', the signal is $\delta_I>0$. The phase adjust unit 119' reduces the phase of the phase shifter since the input signal is positive. Thus, the phase turns closer to the target value $\pi/4$. If the phase shifter 106 has a negative phase error, then the output of the phase monitor unit is positive, then the input of the phase adjust unit is negative after inversion, so that the phase adjust unit increases the phase of the phase shifter. Thus, the phase also turns to the target value. If the phase error is zero, the output of the phase monitor unit is also zero. The phase adjust unit does not act. Thus, the target phase is kept.

Correspondingly, if the phase of Q branch phase shifter 109 is $-\pi/4+\delta_Q$, which has a positive phase error $\delta_Q>0$. At this time, the output 131 from the phase monitor unit is $\delta_Q$. The phase adjust unit 123' reduces the phase of the phase shifter since the input signal is positive. Thus, the phase turns closer to the target value $-\pi/4$. If the phase shifter 109 has a negative phase error, then the output of the phase monitor unit is negative, so that the phase adjust unit 123' increases the phase of the phase shifter. Thus, the phase also turns to the target value. If the phase error is zero, the output of the phase monitor unit is also zero. The phase adjust unit does not act. Thus, the target phase is kept.

It is obvious that the inversion apparatus 122' can be implemented as an inverting amplifier in I branch, and the non-inverting amplifier can be connected in series between the phase adjust unit 123' and the averaging circuit 121 of the phase control apparatus 115 in Q branch. It is obvious after persons skilled in the art read the present Description, and not detailed in the Description.

The non-inverting amplifier, inverting amplifier and the like mentioned above can employ the devices well known to persons skilled in the art, such as the chips of amplifier series of Maxim Corporation.

Variations of the First Through Third Embodiments

The present invention is not limited to the description above, and various modifications and variations can be conceived to persons skilled in the art. For example, an amplifier can be connected in series between mixer and averaging circuit. The amplifiers having different gains can be applied to two branches. Furthermore, in the embodiments described above, the phase adjust units in two branches are same, however the phase adjust units can be different. When two different phase adjust units are employed, the phase adjust unit in one branch increases the phase of the phase shifter of the interferometer in this branch when the input signal of the phase adjust unit is positive, while the phase adjust unit in the other branch reduces the phase of the phase shifter of the interferometer in the corresponding branch when the input signal of the phase adjust unit is positive.

Apparently, compared with the first embodiment, if the phase adjust unit 119 of the phase control apparatus 112 is replaced by the phase adjust actor 119' shown in FIG. 3, an inverter should be connected in series to the averaging circuit 117. Similarly, if the phase adjust unit 123 in the first embodiment is replaced by the phase adjust unit 123' illustrated with reference to FIG. 3, the inversion circuit 122 should be omitted.

Furthermore, low pass filters can be added before the mixer to filter the two input signals, which are connected to the input of the data recovery circuit of this branch, and the output of the data recovery circuit of the other branch. In this case, the low pass filters should be placed just before the data recovery circuit (just after the balanced optical detector) of this branch and just after the data recovery circuit of the other branch. That is to say, as shown in FIG. 4, in I branch 102, low pass filters 151 and 152 may be provided for filtering the signal 124 and 129, respectively. In Q branch 103, low pass filters 153 and 154 may be provided for filtering the signal 128 and 125, respectively. Although the low pass filters 151-154 are provided in the receiver of first embodiment in FIG. 4, they may be provided in the receiver of second or third embodiment. This should be construed broadly and should not be limited to the signal just before data recovery of this branch and the signal just after data recovery of the other branch. These solutions will be apparent to those skilled in the art after he or she has read and understand the principle of this invention and after has the practice on the invention.

In addition, according to the embodiments described above, the present invention is to provide a phase control method for optical DQPSK receiver having a first branch and a second branch, and each branch contains an interferometer, a balanced optical detector and a data recovery circuit. The method comprises the steps of: obtaining the phase error signal with a sign in the first branch of the optical DQPSK receiver based on the signal before data recovery of the first branch and the signal after data recovery of the second branch; adjusting the phase in the first branch of the optical DQPSK receiver based on the phase error signal with a sign in the first branch of the optical DQPSK receiver; obtaining the phase error signal with a sign in the second branch of the optical DQPSK receiver based on the signal before data recovery of the second branch and the signal after data recovery of the first branch; adjusting the phase in the second branch of the optical DQPSK receiver based on the phase error signal with a sign in the second branch of the optical DQPSK receiver.

Although the present invention has been explained with reference to the first through third embodiments for the purpose of completion and clearness appropriate for disclosure, the appended claims are not limited to these embodiments, but composed of all the modifications and variations conceivable by persons skilled in the art within the essential teachings described here.

Specific Embodiments

Figure 5:
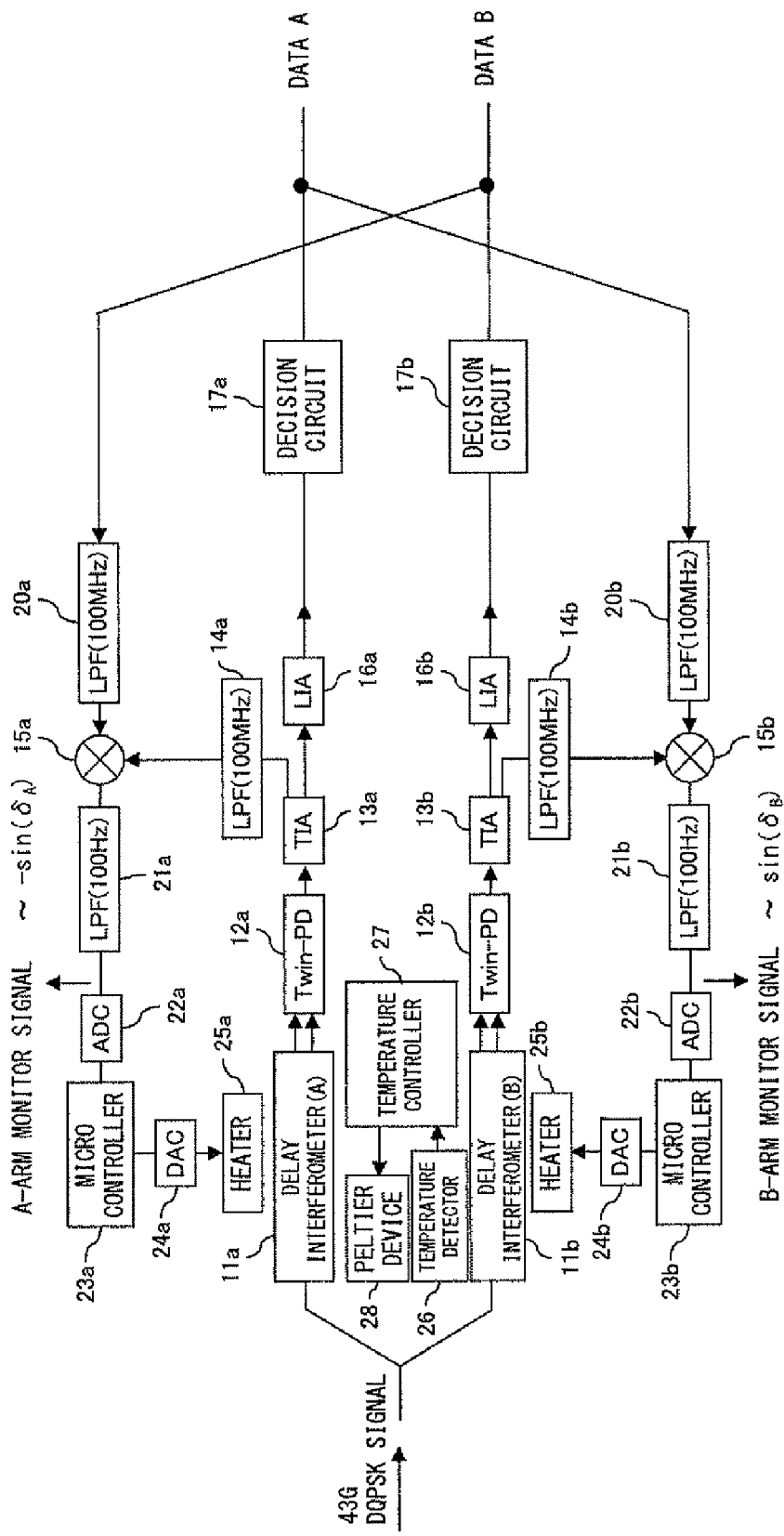
FIG. 5 shows the configuration of specific embodiment of the optical DQPSK receiver of the present invention.

FIG. 5 shows the configuration of specific embodiment of the optical DQPSK receiver of the present invention. In the following description, either one of I branch and Q branch is called as "A branch", and the other one of I branch and Q branch is called as "B branch".

In FIG. 5, an input DQPSK signal (or an RZ-DQPSK signal) is split and one is directed to a delay interferometer 11a provided in A branch and another is directed to a delay interferometer 11b provided in B branch. Each of the delay interferometers 11a and 11b corresponds to the interferometers 104 and 107, respectively. In other words, the delay interferometer 11a comprises the optical delay element 105 and the phase shifter 106, and the delay interferometer 11b comprises the optical delay element 108 and the phase shifter 109. The phase of the phase shift element 106/109 is adjusted by utilizing the temperature change in this embodiment. In this case, for example, when the temperature of the phase shifter 106/109 increases, the phase increases. However, the present invention is not limited to the description above, the phase of the phase shifter 106/109 may be adjusted by employing voltage change etc., for example. Optical detectors (Twin-PD) 12a and 12b correspond to the balanced optical detectors 110 and 113 respectively, and generate a current signal corresponding to optical outputs of the delay interferometers 11a and 11b. A transimpedance amplifier (TIA) 13a/13b converts the current signal generated by the optical detector 12a/12b into voltage signal, respectively. The output signals of TIA 13a/13b correspond to signals 124/128 as shown in FIG. 1 to FIG. 3.

The output signal of the TIA 13a is directed to a mixer 15a via a low pass filter 14a, and also directed to a decision circuit 17a via a limiter amplifier (LIA) 16a. The output signal of the TIA 13b is directed to a mixer 15b via a low pass filter 14b, and also directed to a decision circuit 17b via a limiter amplifier (LIA) 16b. Here, the mixers 15a and 15b correspond to the mixers 116 and 120, respectively. The cutoff frequency of each of the low pass filters 14a and 14b is about 100 MHz, for example.

The decision circuits 17a and 17b correspond to the data recovery circuits 111 and 114, and each of the circuits comprises one or a plurality of D flip-flop circuit(s). Each of the decision circuits 17a and 17b, employing a clock recovered from a received signal, performs logical decision on the output signal of the LIA 16a and 16b. The transmission data is recovered based on data A output from the decision circuit 17a and data B output from the decision circuit 17b.

The output signal (data A) of the decision circuit 17a is provided to the mixer 15b via the low pass filter 20b. In the same manner, the output signal (data B) of the decision circuit 17b is provided to the mixer 15a via the low pass filter 20a. The output signals of the decision circuits 17a and 17b correspond to signals 125 and 129, respectively. The cutoff frequency of each of the low pass filters 20a and 20b is about 100 MHz, for example.

The mixer 15a multiplies the output signal of the low pass filter 14a and the output signal of the low pass filter 20a. In the same manner, the mixer 15b multiplies the output signal of the low pass filter 14b and the output signal of the low pass filter 20b. The output signals of the mixer 15a and 15b, after having high-frequency component removed by the low pass filters 21a and 21b, are converted into digital data by A/D converters 22a and 22b. The low pass filters 21a and 21b correspond to the averaging circuit 117 and 121, and the cutoff frequency of these circuits is about 100 Hz, for example.

As described above, the mixer 15a multiplies a signal obtained from the previous stage of the decision circuit 17a of A branch with a signal obtained from the subsequent stage of the decision circuit 17b of B branch. In the same manner, the mixer 15b multiplies a signal obtained from the previous stage of the decision circuit 17b of B branch and a signal obtained from the subsequent stage of the decision circuit 17a of A branch.

A micro controller 23a performs a prescribed calculation on the digital signal output from the A/D converter 22a, and generates a phase adjust signal for A branch. In the same manner, a micro controller 23b performs a prescribed calculation on the digital signal output from the A/D converter 22b, and generates a phase adjust signal for B branch. The micro controllers 23a and 23b may be realized by one processor. In order to realize the first embodiment, a function of the inversion circuit 122 may be provided by calculation of the micro controller 23b. In order to realize the second embodiment, a function of the non-inverting amplifier 118 may be provided by calculation of the micro controller 23a, and a function of the inverting amplifier 122 may be provided by calculation of the micro controller 23b. In addition, in order to realize the third embodiment, a function of the inversion circuit 122' may be provided by calculation of the micro controller 23a.

Each of the phase adjust signals generated by the micro controllers 23a and 23b is converted into analog signals by D/A converters 24a and 24b, respectively, and is provided to heaters 23a and 25b. In other words, the heaters 25a and 25b are controlled by the micro controllers 23a and 23b. As a result, temperature of the phase shifter of the delay interferometer 11a of A branch and that of the phase shifter of the delay interferometer 11b of B branch are individually adjusted. The phase of the phase shifter of the delay interferometers 11a and 11b depends on the temperature. Consequently, the phase of the phase shifter (that is, amount of phase shift by the phase shifter) of the delay interferometers 11a and 11b is adjusted by the phase adjust signal generated by the micro controllers 23a and 23b.

A temperature detector 26 detects the temperature around the delay interferometers 11a and 11b. A temperature controller 27, based on the detection result by the temperature detector 26, generates a temperature control signal for maintaining a prescribed temperature around the delay interferometers 11a and 11b. A peltier device 28 maintains a prescribed temperature around the delay interferometers 11a and 11b in accordance with the temperature control signal. If it is possible to adjust the phase of the phase shifter of the delay interferometers 11a and 11b to a desired value by heaters 25a and 25b alone, the temperature detector 26, the temperature controller 27, and the peltier device 28 do not need to be provided.

In the optical DQPSK receiver having the above configuration, the micro controller 23a controls the heater 25a so that an A-arm monitor signal output from the low pass filter 21a becomes zero. In the same manner, the micro controller 23b controls the heater 25b so that a B-arm monitor signal output from the low pass filter 21b becomes zero. At this point, under the premises that the phase error of the phase shifter of the delay interferometer 11a is "$\delta_A$", the A-arm monitor signal is proportional to "$-\sin(\delta_A)$" as explained with reference to FIG. 1. Similarly, under the premises that the phase error of the phase shifter of the delay interferometer 11b is "$\delta_B$", the B-arm monitor signal is proportional to "$\sin(\delta_B)$". In addition, as explained with reference to FIG. 1, when the phase of the phase shifter of the delay interferometer 11a is maintained at a desired value (e.g. $\pi/4$), the A-arm monitor signal output from the low pass filter 21a becomes zero, and when the phase of the phase shifter of the delay interferometer 11b is maintained at a desired value (e.g. $-\pi/4$), the B-arm monitor signal output from the low pass filter 21b becomes zero.

As clear from the above operation, the mixer 15 (15a and 15b), the low pass filter 21 (21a and 21b), and the micro controller 23 (23a and 23b) operate as the phase monitor unit (described in the first through third embodiments). In addition, the mixer 15 (15a and 15b), the low pass filter 21 (21a and 21b), the micro controller 23 (23a and 23b) and the heater 25 (25a and 25b) operate as the phase control apparatus (described in the first through third embodiments).

Figure 6:
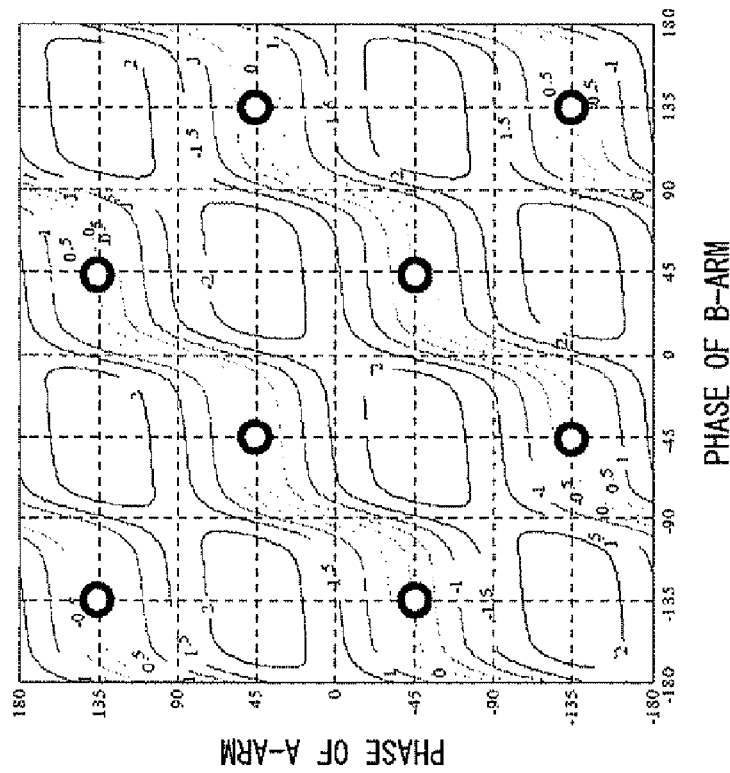
FIG. 6 shows a simulation result of the phase monitor signal.
Figure 6:
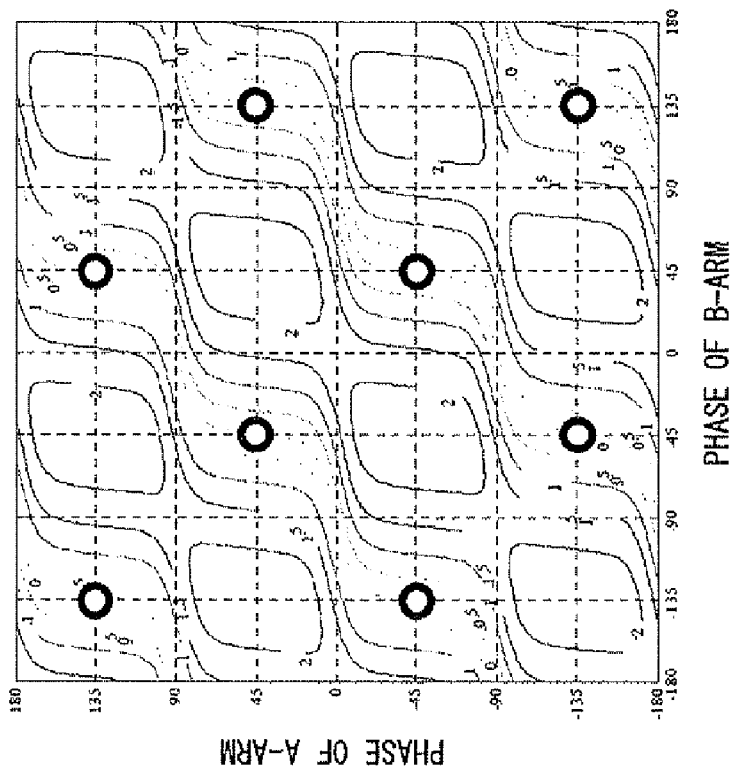

FIG. 6 shows a simulation result of the phase monitor signal. In FIG. 6, a phase monitor signal obtained by having the phase of the phase shifter of the delay interferometer 11a provided in A branch and the phase of the phase shifter of the delay interferometer 11b provided in B branch as parameters is shown.

In FIG. 6, each of the circle symbols indicates a combination that both of the A-arm monitor signal and the B-arm monitor signal stably become zero. In other words, when the phase of the phase shifter of the delay interferometers 11a and 11b are adjusted to any of the following eight combinations, both of the A-arm monitor signal and the B-arm monitor signal stably become zero.

Combination Pattern 1:

Phase of A-arm is 45 degree, Phase of B-arm is −45 degree

Combination Pattern 2:

Phase of A-arm is −135 degree, Phase of B-arm is −45 degree

Combination Pattern 3:

Phase of A-arm is −135 degree, Phase of B-arm is 135 degree

Combination Pattern 4:

Phase of A-arm is 45 degree, Phase of B-arm is 135 degree

Combination Pattern 5:

Phase of A-arm is −45 degree, Phase of B-arm is −135 degree

Combination Pattern 6:

Phase of A-arm is 135 degree, Phase of B-arm is −135 degree

Combination Pattern 7:

Phase of A-arm is −45 degree, Phase of B-arm is 45 degree

Combination Pattern 8:

Phase of A-arm is 135 degree, Phase of B-arm is 45 degree

Data (0/1) decided by the decision circuits 17a and 17b may be changed depending on the combination pattern. However, if the processing for recovering the transmission data from the output data of the decision circuits 17a and 17b is appropriately modified, the transmission data can be properly recovered. Therefore, in the above embodiment, the desired value of the phase of the A branch is "$\pi/4$" and the desired value of the phase of the B branch is "$-\pi/4$"; however, the present invention is not limited to this combination.

FIG. 7 is a flowchart showing phase control processing in the optical DQPSK receiver shown in FIG. 5. The processing is repeated by the micro controllers 23a and 23b at a prescribed time interval.

In step S1, the A-arm monitor signal, which is an output signal of the low pass filter 21a, is obtained. When the phase of the phase shifter (that is, the amount of phase shift by the phase shifter) of the delay interferometer 11a deviates from the desired value by "$\delta_A$", the A-arm monitor signal is "$-\sin(\delta_A)$" as described above. In other words, if the phase of the phase shifter of the delay interferometer 11a is smaller than the desired value ($\delta_A<0$), the A-arm monitor signal has a positive value. Contrary, if the phase of the phase shifter of the delay interferometer 11a is larger than the desired value ($\delta_A>0$), the A-arm monitor signal has a negative value.

Consequently, if the A-arm monitor signal is zero or negative, the phase of the phase shifter of the delay interferometer 11a is determined to be larger than the desired value. In such a case, in order to reduce the phase in step S2, a phase adjust signal instructing to lower the temperature of the heater 25a is generated. If the A-arm monitor signal is positive, the phase of the phase shifter of the delay interferometer 11a is determined to be smaller than the desired value. In this case, in order to increase the phase in step S3, a phase adjust signal instructing to raise the temperature of the heater 25a is generated.

In step S4, a B-arm monitor signal, which is an output signal of the low pass filter 21b, is obtained. When the phase of the phase shifter (that is, the amount of phase shift by the phase shifter) of the delay interferometer 11b deviates from the desired value by "$\delta_B$", the B-arm monitor signal is "$\sin(\delta_B)$" as described above. In other words, if the phase of the phase shifter of the delay interferometer 11b is smaller than the desired value ($\delta_B<0$), the B-arm monitor signal has a negative value. Contrary, if the phase of the phase shifter of the delay interferometer 11b is larger than the desired value ($\delta_B>0$), the B-arm monitor signal has a positive value.

Consequently, if the B-arm monitor signal is zero or negative, the phase of the phase shifter of the delay interferometer 11b is determined to be smaller than the desired value. In such a case, in order to increase the phase in step S5, a phase adjust signal instructing to raise the temperature of the heater 25b is generated. If the B-arm monitor signal is positive, the phase of the phase shifter of the delay interferometer 11b is determined to be larger than the desired value. In this case, in order to reduce the phase in step S6, a phase adjust signal instructing to lower the temperature of the heater 25b is generated.

By repeating the processing in the above steps S1-S6, the phase of the phase shifter of the delay interferometers 11a and 11b converges at the desired value. The processing in steps S1-S3 and the processing in steps S4-S6 may be performed in parallel.

When the phase monitor signals (A-arm monitor signal and B-arm monitor signal) are substantially zero, the phase of the delay interferometer is determined to be converged at the desired value. In such a case, the state of the corresponding heater may be maintained without performing the processing in steps S2, S3, S5, or S6.

In the configuration presented in the embodiment shown in FIG. 7, when the phase monitor signal in A branch is "positive", the temperature of the corresponding heater is raised, and when the phase monitor signal in B branch is "positive", the temperature of the corresponding heater is lowered. However, the present invention is not limited to the above configuration. In other words, the present invention includes a configuration such that when the phase monitor signal in A branch is "positive", the temperature of the corresponding heater is lowered, and when the phase monitor signal in B branch is "positive", the temperature of the corresponding heater is raised.

FIG. 9A and FIG. 9B show a simulation result of the operation to converge the phase of the delay interferometers at a desired value. The following description is under the premises that the phase of the delay interferometers 11a and 11b at the time of phase control start is "132 degrees" and "120 degrees", respectively. The control step, converted into the phase of the delay interferometers 11a and 11b, is "two degrees". The control step represents the amount of phase change obtained every time the processing in the flowchart shown in FIG. 7 or FIG. 8 is performed.

Figure 8:
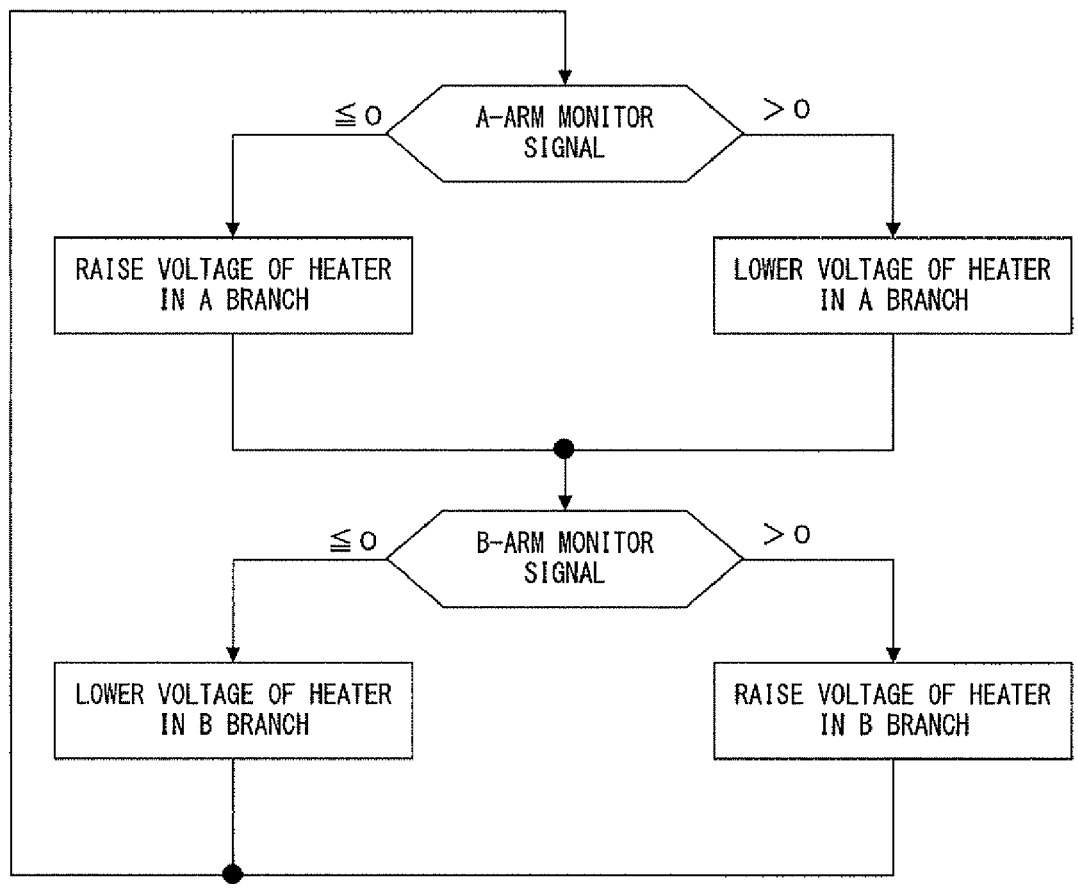
FIG. 8 is a flowchart showing phase control processing in the modified method.

The phase control apparatus of the embodiment repeats the processing in the flowchart shown in FIG. 7 or FIG. 8 so that both A-arm and B-arm phase monitor signals converge at zero. As a result, the phases of the delay interferometers 11a and 11b approach to the desired values, 45 degrees and 135 degrees, respectively.

Detailed embodiment of the phase monitor method of the present invention is explained next. In the phase monitor method of the present invention, an error is detected from a desired value of the phase of the phase shifter of the delay interferometers 11a and 11b.

Figure 10:
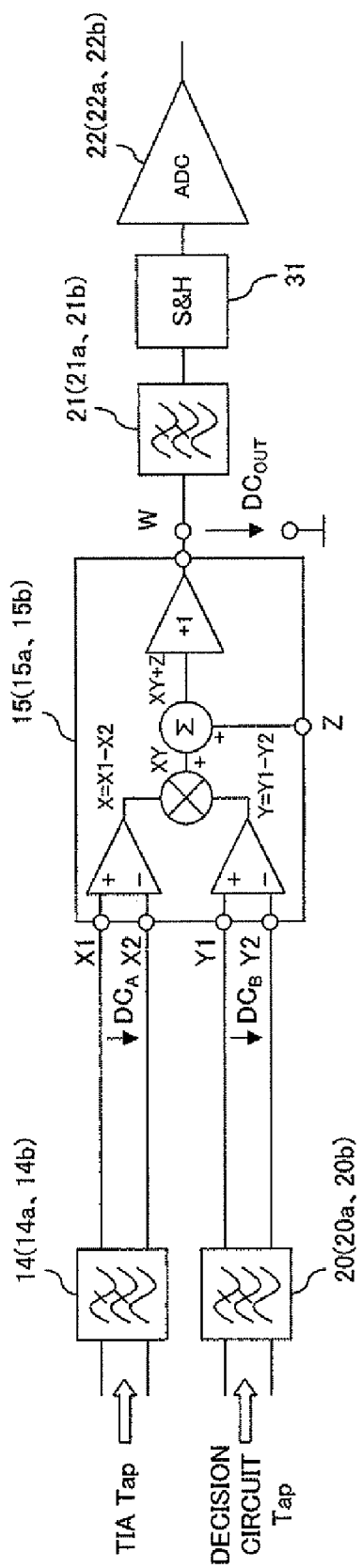
FIG. 10 explains an issue to be solved in monitoring the phase error.

FIG. 10 explains an issue to be solved in monitoring the phase error. A sample and hold circuit 31 shown in FIG. 10 is a circuit temporarily holding analog data converted in the A/D converter 22 (22a and 22b), and is omitted in FIG. 5.

In order to generate a phase monitor signal representing the phase error, an output signal x of the low pass filter 14 (14a and 14b) is multiplied by an output signal y of the low pass filter 20 (20a and 20b) by using the mixer 15 (15a and 15b) as explained above. The output signal of the mixer 15 is ideally "$xy(=(X1-X2)\times(Y1-Y2))$". However, each of the signal x and the signal y contains DC components ($DC_A$ and $DC_B$). The DC components are also generated in the mixer 15, and thus the actual output signal w of the mixer 15 "$xy+DC_{OUT}$"

It is desirable that the phase of the phase shifter of the delay interferometers 11a and 11b is adjusted within a range of a desired value (e.g. $\pi/4$, $-\pi/4$)±1 degree in order to acquire favorable optical receiving characteristics. However, the phase monitor signal obtained by filtering the output signal of the mixer 15 by the low pass filter 21 (21a and 21b) becomes considerably small even in a case that the input level of the mixer 15 is appropriately adjusted. For example, when the AD835 manufactured by Analog Device is used as the mixer 15, change in the voltage level of the phase monitor signal in response to the phase error is approximately 1 mV/degree. That is, the voltage level of the phase monitor signal has to be monitored to accuracy of 1 mV or less, in order to acquire favorable optical receiving characteristics.

However, DC offset "$DC_{OUT}$" generated in the mixer 15 differs device by device, and is dependent on the temperature. In addition, DC offset of the above AD 835 is approximately ±75 mV. Therefore, it is not easy to accurately detect the phase monitor signal. That is, influence of DC offset generated in the mixer 15 has to be removed, in order to detect the phase monitor signal accurately.

Figure 11:
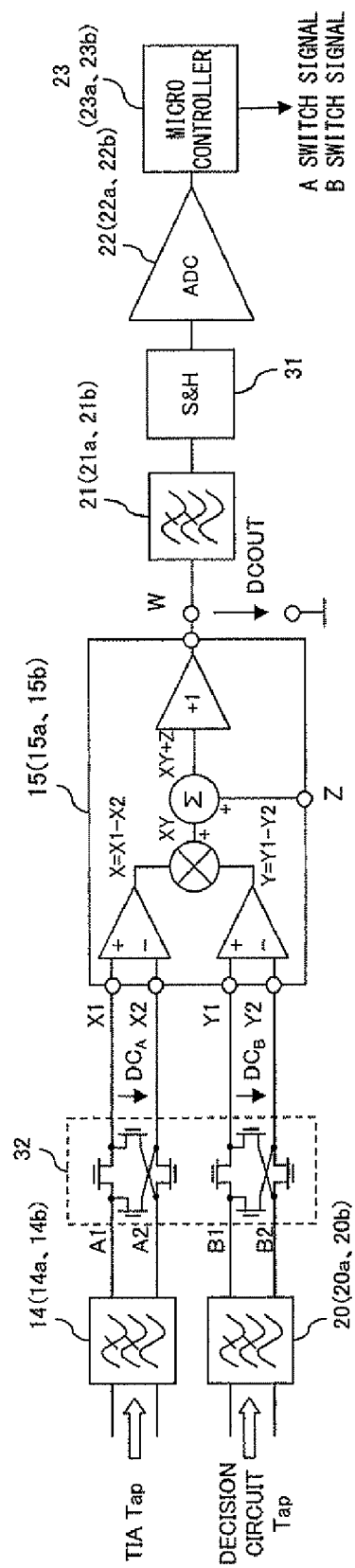
FIG. 11 shows the specific configuration of the phase monitor apparatus.

FIG. 11 shows the configuration of the phase monitor apparatus of the embodiment. The configuration and the operation of the phase monitor apparatus are basically the same in A branch and B branch.

The phase monitor apparatus of the embodiment comprises a switch circuit 32 between the low pass filters 14, 20 and the mixer 15. The switch circuit 32 controls the polarity of the output signal of the low pass filters 14 and 20 in accordance with the control signal from the micro controller 23, as explained in detail later. The sample and hold circuit 31 holds an input signal at a timing of a trigger signal generated by the micro controller 23. At that time, the trigger signal is synchronized with the control signal provided to the switch circuit 32. The micro controller 23 generates a phase monitor signal by performing a prescribed calculation on the output signal of the A/D converter 22.

The micro controller 23 generates control signals so that the switch circuit 32 cyclically repeats the following State 1 through State 4.

State 1: An output signal of the low pass filter 14 is provided to the mixer 15, and an output signal of the low pass filter 20 is provided to the mixer 15

State 2: An output signal of the low pass filter 14 is inverted and provided to the mixer 15, and an output signal of the low pass filter 20 is provided to the mixer 15

State 3: An output signal of the low pass filter 14 is inverted and provided to the mixer 15, and an output signal of the low pass filter 20 is inverted and provided to the mixer 15

State 4: An output signal of the low pass filter 14 is provided to the mixer 15, and an output signal of the low pass filter 20 is inverted and provided to the mixer 15

The output signals of the mixer 15, W1 through W4, in each of State 1 through State 4, respectively, are provided as below.

$$W1=DC_{OUT}+(A1-A2+DC_A)\times(B1-B2+DC_B)$$

$$W2=DC_{OUT}+(A2-A1+DC_A)\times(B1-B2+DC_B)$$

$$W3=DC_{OUT}+(A2-A1+DC_A)\times(B2-B1+DC_B)$$

$$W4=DC_{OUT}+(A1-A2+DC_A)\times(B2-B1+DC_B)$$

The micro controller 23 generates a phase monitor signal by performing the following calculation, using the output signals W1-W4 obtained in the above manner.

$$\text{Phase Monitor Signal}=W1-W2+W3-W4=4(A1-A2)(B1-B2)$$

In the above calculation, "A1−A2" is voltage of the output signal of the low pass filter 14, and "B1−B2" is voltage of the output signal of the low pass filter 20. Therefore, by the above calculation, a phase monitor signal from which the DC components ($DC_A$, $DC_B$, and $DC_{OUT}$) removed is obtained.

Figure 12A:
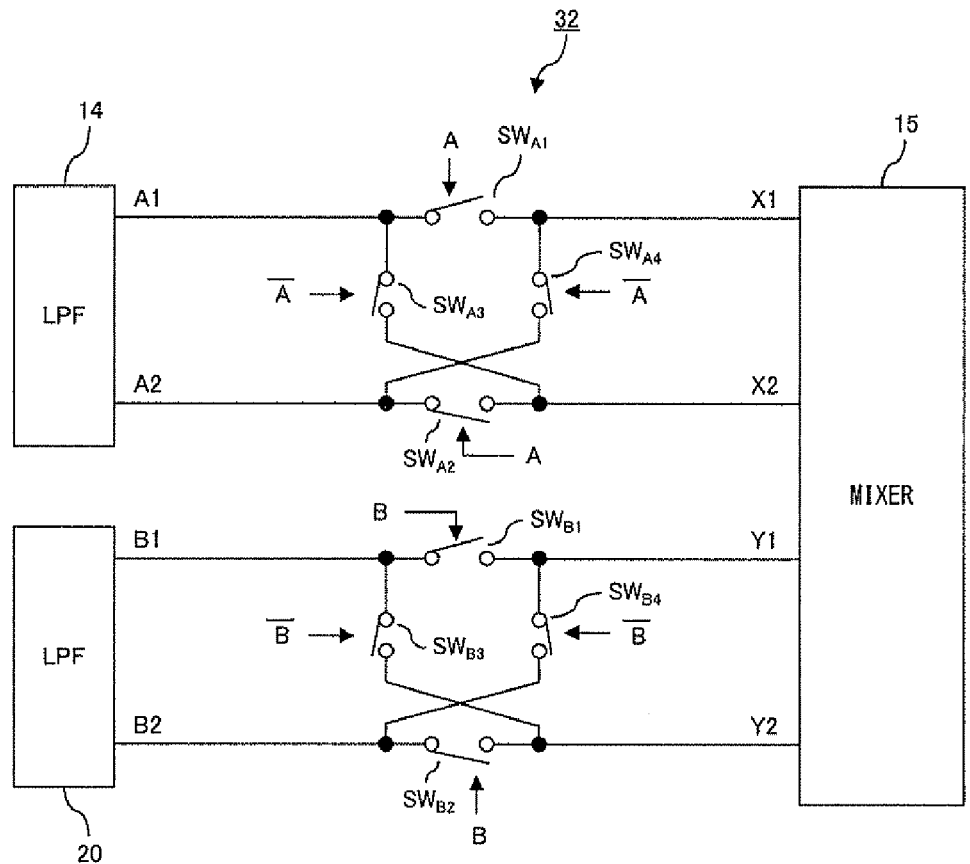
FIG. 12A shows an embodiment of the switch circuit.

FIG. 12A shows an embodiment of the switch circuit 32. The switch circuit 32 in this embodiment comprises four switches $SW_{A1}$-$SW_{A4}$ provided between the low pass filter 14 and the mixer 15 and four switches $SW_{B1}$-$SW_{B4}$ provided between the low pass filter 20 and mixer 15. The switches $SW_{A1}$-$SW_{A4}$ and $SW_{B1}$-$SW_{B4}$ are not limited in particular; however, the switches are analog switches comprising transistors, for example.

The switches $SW_{A1}$ and $SW_{A2}$ are controlled by an A switch signal, and the switches $SW_{A3}$ and $SW_{A4}$ are controlled by an inverted A switch signal obtained by inverting the logic of the A switch signal. In the same manner, the switches $SW_{B1}$ and $SW_{B2}$ are controlled by a B switch signal, and the switches $SW_{B3}$ and $SW_{B4}$ are controlled by an inverted B switch signal obtained by inverting the logic of the B switch signal. The A switch signal, the inverted A switch signal, the B switch signal, and the inverted B switch signal are generated by the micro controller 23.

In the switch circuit 32 having the above configuration, if the A switch signal is "ON", the switches $SW_{A1}$ and $SW_{A2}$ are controlled to be ON state and the switches $SW_{A3}$ and $SW_{A4}$ are controlled to be OFF state. In such a case, "X1=A1" and "X2=A2" are obtained, and an output signal of the low pass filter 14 is provided to the mixer 15 without any modification. If the A switch signal is "OFF", the switches $SW_{A1}$ and $SW_{A2}$ are controlled to be OFF state, and the switches $SW_{A3}$ and $SW_{A4}$ are controlled to be ON state. In such a case, "X1=A2" and "X2=A1" are obtained, and an output signal of the low pass filter 14 is inverted and provided to the mixer 15. In the same manner, if the B switch signal is "ON", the switches $SW_{B1}$ and $SW_{B2}$ are controlled to be ON state and the switches $SW_{B3}$ and $SW_{B4}$ are controlled to be OFF state. In such a case, "Y1=B1" and "Y2=B2" are obtained, and an output signal of the low pass filter 20 is provided to the mixer 15 without any modification. If the B switch signal is "OFF", the switches $SW_{B1}$ and $SW_{B2}$ are controlled to be OFF state, and the switches $SW_{B3}$ and $SW_{B4}$ are controlled to be ON state. In such a case, "Y1=B2" and "Y2=B1" are obtained, and an output signal of the low pass filter 20 is inverted and provided to the mixer 15.

Figure 12B:
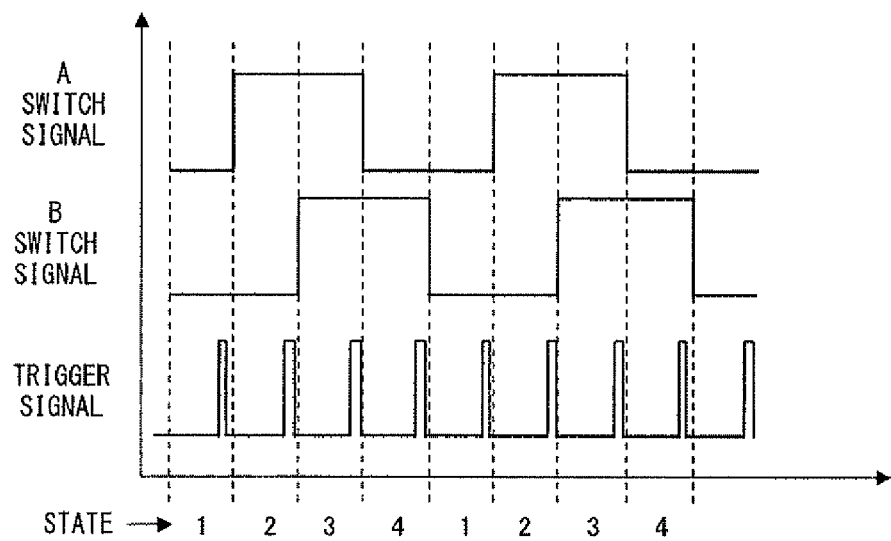
FIG. 12B explains the operation of the phase monitor apparatus.

FIG. 12B explains the operation of the phase monitor apparatus. The micro controller 23 generates a phase monitor signal by cyclically generating the four states (State 1 through State 4) using the A switch signal and the B switch signal.

State 1: The A switch signal and the B switch signal are set to "ON". In this case, the output signals of the low pass filters 14 and 20 are provided to the mixer 15 without any modification. Consequently, an output W1 of the mixer 15 is as below.

$$W1=DC_{OUT}+(A1-A2+DC_A)\times(B1-B2+DC_B)$$

State 2: The A switch signal is set to "OFF", and the B switch signal is set to "ON". In this case, the output signal of the low pass filter 14 is inverted and provided to the mixer 15, and the output signal of the low pass filter 20 is provided to the mixer 15 without any modification. Consequently, an output W2 of the mixer 15 is as below.

$$W2=D_{OUT}+(A2-A1+DC_A)\times(B1-B2+DC_B)$$

State 3: The A switch signal and the B switch signal are set to "OFF". In this case, both of the output signals of the lowpass filters 14 and 20 are inverted and provided to the mixer 15. Consequently, an output W3 of the mixer 15 is as below.

$$W3=DC_{OUT}+(A2-A1+DC_A)\times(B2-B1+DC_B)$$

State 4: The A switch signal is set to "ON" and the B switch signal is set to "OFF". In this case, the output signal of the low pass filter 14 is provided to the mixer 15 without any modification, and the output signal of the low pass filter 20 is inverted and provided to the mixer 15. Consequently, an output W4 of the mixer 15 is as below, $$W4=DC_{OUT}+(A1-A2+DC_A)\times(B2-B1+DC_B)$$

The micro controller 23 generates a trigger signal in response to each of the above State 1 through State 4. The sample and hold circuit 31 holds an output signal of the mixer 15 every time the trigger signal is provided. By so doing, the micro controller 23 obtains signals W1-W4. The micro controller 23, then, generates a phase monitor signal from the signals W1-W4 according to the above calculations.

As explained above, according to the phase monitor apparatus of the embodiment, it is possible to generate a phase monitor signal, which does not contain a DC component. Thus, the control of the heaters 25a and 25b by using the phase monitor signal enables to maintain the phase of the phase shifter of the delay interferometers 11a and 11b at a desired value with accuracy. As a result, the receiving characteristics of the optical DQPSK receiver are improved. The phase monitor apparatus explained with reference to FIGS. 11 and 12 can be applied to any of the first through third embodiments described above.

The present invention comprises a phase monitor apparatus, a phase control apparatus, an optical DQPSK receiver, a phase monitor method, and a phase control method described below, in addition to the first through the third embodiments and the specific embodiment described above.

The invention claimed is:

1. A phase monitor apparatus for optical DQPSK receiver, said optical DQPSK receiver including a first branch and a second branch, and each branch containing an interferometer, a balanced optical detector and a data recovery circuit, said phase monitor apparatus for optical DQPSK receiver for monitoring phase error in one of the branches of said optical DQPSK receiver, characterized in that
said phase monitor apparatus for optical DQPSK receiver includes a mixer and an averaging circuit connected in series;
said mixer is used to mix the signal before data recovery of this branch with the signal after data recovery of the other branch;
said averaging circuit is used to average the signal from said mixer.

2. The phase monitor apparatus for optical DQPSK receiver according to claim 1, characterized in that said averaging circuit is implemented as a low pass filter or a digital signal processor in the way of averaging.

3. The phase monitor apparatus for optical DQPSK receiver according to claim 1, characterized in that said mixer is implemented as an analog mixer or implemented by an A/D converter and a digital signal processor which is in series with the A/D converter.

4. The phase monitor apparatus for optical DQPSK receiver according to claim 1, characterized in that an amplifier is connected in series between said mixer and said averaging circuit.

5. The phase monitor apparatus for optical DQPSK receiver according to claim 1, characterized by comprising:
a first low pass filter for low-pass filtering the signal before data recovery in this branch input to said mixer; and
a second low pass filter for low-pass filtering the signal after data recovery in the other branch input to said mixer.

6. A phase control apparatus for optical DQPSK receiver, said optical DQPSK receiver including a first branch and a second branch, and each branch containing an interferometer, a balanced optical detector and a data recovery circuit, characterized in that
said phase control apparatus for optical DQPSK receiver includes a first phase control branch and a second phase control branch corresponding to the first branch and the second branch of said optical DQPSK receiver, respectively;
said first phase control branch includes a first phase monitor apparatus and a first phase adjust unit connected in series; said second phase control branch includes a second phase monitor apparatus, an inversion circuit and a second phase adjust unit connected in series;
said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver; said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver;
said inversion circuit is used to generate phase adjust signal based on input signal thereof;
said first and said second phase adjust units are used to adjust the phase of said interferometer in corresponding branch of said optical DQPSK receiver based on input signal thereof.

7. The phase control apparatus for optical DQPSK receiver according to claim 6, characterized in that said first and said second phase monitor apparatus include a mixer and an averaging circuit connected in series, respectively.

8. The phase control apparatus for optical DQPSK receiver according to claim 7, characterized in that said averaging circuit is implemented as a low pass filter or a digital signal processor in the way of averaging.

9. The phase control apparatus for optical DQPSK receiver according to claim 7, characterized in that said mixer is implemented as an analog mixer or implemented by an A/D converter and a digital signal processor which is in series with the A/D converter.

10. The phase control apparatus for optical DQPSK receiver according to claim 7, characterized in that said first and said second phase monitor apparatus further comprise respectively:
a first low pass filter for low-pass filtering the signal before data recovery in this branch input to said mixer; and
a second low pass filter for low-pass filtering the signal after data recovery in the other branch input to said mixer.

11. The phase control apparatus for optical DQPSK receiver according to claim 6, characterized in that
said first branch of said optical DQPSK receiver is I branch, said second branch is Q branch, said inversion circuit is an inverter;
said first and second phase adjust units increase the phase of said interferometer in corresponding branch of said optical DQPSK receiver when the input signal is positive, and reduce the phase of said interferometer in corresponding branch of said optical DQPSK receiver when the input signal is negative.

12. The phase control apparatus for optical DQPSK receiver according to claim 11, characterized in that
said first phase control branch includes one or more first amplifiers connected between said first phase monitor apparatus and first phase adjust unit or between said mixer and said averaging circuit of said first phase monitor apparatus;
said second phase control branch includes one or more second amplifiers connected between said second phase monitor apparatus and second phase adjust unit or between said mixer and said averaging circuit of said second phase monitor apparatus.

13. The phase control apparatus for optical DQPSK receiver according to claim 6, characterized in that
said first branch of said optical DQPSK receiver is Q branch; said second branch is I branch; said inversion circuit is an inverter;
said first and second phase adjust units increase the phase of said interferometer in corresponding branch of said optical DQPSK receiver when the input signal is negative, and reduce the phase of said interferometer in corresponding branch of said optical DQPSK receiver when the input signal is positive.

14. The phase control apparatus for optical DQPSK receiver according to claim 13, characterized in that
said first phase control branch includes one or more first amplifiers connected between said first phase monitor apparatus and first phase adjust unit or between said mixer and said averaging circuit of said first phase monitor apparatus;
said second phase control branch includes one or more second amplifiers connected between said second phase monitor apparatus and second phase adjust unit or between said mixer and said averaging circuit of said second phase monitor apparatus.

15. A phase control apparatus for optical DQPSK receiver, said optical DQPSK receiver including a first branch and a second branch, and each branch containing an interferometer, a balanced optical detector and a data recovery circuit, characterized in that
said phase control apparatus for optical DQPSK receiver includes a first phase control branch and a second phase control branch corresponding to the first branch and the second branch of said optical DQPSK receiver, respectively;
said first phase control branch includes a first phase monitor apparatus and a first phase adjust unit connected in series, said second phase control branch includes a second phase monitor apparatus and a second phase adjust unit connected in series;
said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver; said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver;
said first phase adjust unit increases the phase of said interferometer in corresponding branch of said optical DQPSK receiver when the input signal thereof is positive, and reduces the phase of said interferometer in corresponding branch of said optical DQPSK receiver when the input signal thereof is negative; said second phase adjust unit reduces the phase of said interferometer in corresponding branch of said optical DQPSK receiver when the input signal thereof is positive, and increases the phase of said interferometer in corresponding branch of said optical DQPSK receiver when the input signal thereof is negative.

16. The phase control apparatus for optical DQPSK receiver according to claim 15, characterized in that said first and second phase monitor apparatus include a mixer and an averaging circuit connected in series, respectively.

17. The phase control apparatus for optical DQPSK receiver according to claim 16, characterized in that said first and second phase monitor apparatus further comprise respectively:
a first low pass filter for low-pass filtering the signal before data recovery in this branch input to said mixer; and
a second low pass filter for low-pass filtering the signal after data recovery in the other branch input to said mixer.

18. The phase control apparatus for optical DQPSK receiver according to claim 16, characterized in that
said first phase control branch includes one or more first amplifiers connected between said first phase monitor apparatus and first phase adjust unit or between said mixer and said averaging circuit of said first phase monitor apparatus;
said second phase control branch includes one or more second amplifiers connected between said second phase monitor apparatus and second phase adjust unit or between said mixer and said averaging circuit of said second phase monitor apparatus.

19. An optical DQPSK receiver having a first branch and a second branch, said first branch containing a first interferometer, a first balanced optical detector, a first data recovery circuit and a first phase control apparatus, said second branch containing a second interferometer, a second balanced optical detector, a second data recovery circuit and a second phase control apparatus, characterized in that
said first phase control branch includes a first phase monitor apparatus and a first phase adjust unit connected in series, and said second phase control branch includes a second phase monitor apparatus, an inversion circuit and a second phase adjust unit connected in series;
said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver; said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver; said inversion circuit is used to generate phase adjust signal based on input signal thereof; said first and second phase adjust units are used to adjust the phase of said interferometer in corresponding branch of said optical DQPSK receiver based on input signal thereof.

20. The optical DQPSK receiver according to claim 19, characterized in that said first and second phase monitor apparatus include a mixer and an averaging circuit connected in series, respectively.

21. The optical DQPSK receiver according to claim 20, characterized in that said averaging circuit is implemented as a low pass filter or a digital signal processor in the way of averaging.

22. The optical DQPSK receiver according to claim 20, characterized in that said mixer is implemented as an analog mixer or implemented by an A/D converter and a digital signal processor which is in series with the A/D converter.

23. The optical DQPSK receiver according to claim 20, characterized in that said first and second phase monitor apparatus further comprise respectively:
a first low pass filter for low-pass filtering the signal before data recovery in this branch input to said mixer; and
a second low pass filter for low-pass filtering the signal after data recovery in the other branch input to said mixer.

24. The optical DQPSK receiver according to any one of claim 19, characterized in that
said first branch of said optical DQPSK receiver is I branch; said second branch is Q branch; said inversion circuit is an inverter;

said first and second phase adjust units increase the phase of said interferometer in corresponding branch of said optical DQPSK receiver when the input signal thereof is positive, and reduce the phase of said interferometer in corresponding branch of said optical DQPSK receiver when the input signal thereof is negative.

25. The optical DQPSK receiver according to any one of claim 19, characterized in that
said first branch of said optical DQPSK receiver is Q branch; said second branch is I branch; said inversion circuit is an inverter;
said first and second phase adjust units increase the phase of said interferometer in corresponding branch of said optical DQPSK receiver when the input signal thereof is negative, and reduce the phase of said interferometer in corresponding branch of said optical DQPSK receiver when the input signal thereof is positive.

26. An optical DQPSK receiver having a first branch and a second branch, said first branch containing a first interferometer, a first balanced optical detector, a first data recovery circuit and a first phase control apparatus, said second branch containing a second interferometer, a second balanced optical detector, a second data recovery circuit and a second phase control apparatus, characterized in that
said first phase control branch includes a first phase monitor apparatus and a first phase adjust unit connected in series; said second phase control branch includes a second phase monitor apparatus and a second phase adjust unit connected in series;
said first phase monitor apparatus is used to obtain the phase error signal with a sign in the first branch of said optical DQPSK receiver based on the signal before data recovery in the first branch of said optical DQPSK receiver and the signal after data recovery in the second branch of said optical DQPSK receiver; said second phase monitor apparatus is used to obtain the phase error signal with a sign in the second branch of said optical DQPSK receiver based on the signal before data recovery in the second branch of said optical DQPSK receiver and the signal after data recovery in the first branch of said optical DQPSK receiver;
said first phase adjust unit increases the phase of said interferometer in corresponding branch of said optical DQPSK receiver when the input signal thereof is positive, and reduces the phase of said interferometer in corresponding branch of said optical DQPSK receiver when the input signal thereof is negative; said second phase adjust unit reduces the phase of said interferometer in corresponding branch of said optical DQPSK receiver when the input signal thereof is positive, and increases the phase of said interferometer in corresponding branch of said optical DQPSK receiver when the input signal thereof is negative.

27. The optical DQPSK receiver according to claim 26, characterized in that said first and second phase monitor apparatus include a mixer and an averaging circuit connected in series, respectively.

28. The optical DQPSK receiver according to claim 27, characterized in that said averaging circuit is implemented as a low pass filter or a digital signal processor in the way of averaging.

29. The optical DQPSK receiver according to claim 27, characterized in that said mixer is implemented as an analog mixer or implemented by an A/D converter and a digital signal processor which is in series with the A/D converter.

30. The optical DQPSK receiver according to claim 27, characterized in that said first and second phase monitor apparatus further comprise respectively:
a first low pass filter for low-pass filtering the signal before data recovery in this branch input to said mixer; and
a second low pass filter for low-pass filtering the signal after data recovery in the other branch input to said mixer.

31. A phase monitor method for optical DQPSK receiver, said optical DQPSK receiver including a first branch and a second branch, and each branch containing an interferometer, a balanced optical detector and a data recovery circuit, said phase monitor method for optical DQPSK receiver for monitoring the phase error in one of the branches of optical DQPSK receiver, comprising the steps of:
mixing the signal before data recovery in this branch with the signal after data recovery in the other branch; and
averaging said mixed signal.

32. The phase monitor method according to claim 31, further comprising the step of filtering said signal before data recovery in this branch and said signal after data recovery in the other branch, respectively, before said mixing.

33. A phase control method for optical DQPSK receiver, said optical DQPSK receiver including a first branch and a second branch, and each branch containing an interferometer, a balanced optical detector and a data recovery circuit, said method comprising the steps of:
obtaining the phase error signal with a sign in the first branch of said optical DQPSK receiver based on the signal before data recovery in the first branch of said optical DQPSK receiver and the signal after data recovery in the second branch of said optical DQPSK receiver;
adjusting the phase of said first branch of said optical DQPSK receiver based on phase error signal with a sign of said first branch of optical DQPSK receiver;
obtaining the phase error signal with a sign in the second branch of said optical DQPSK receiver based on the signal before data recovery in the second branch of said optical DQPSK receiver and the signal after data recovery in the first branch of said optical DQPSK receiver;
adjusting the phase of said second branch of said optical DQPSK receiver based on phase error signal with a sign of said second branch of optical DQPSK receiver.

34. The method according to claim 33, characterized in that the step of obtaining the phase error signal with a sign in a first branch of said optical DQPSK receiver based on the signal before data recovery in a first branch of said optical DQPSK receiver and the signal after data recovery in a second branch of said optical DQPSK receiver, comprising:
mixing the signal before data recovery input to first branch with the signal after data recovery in second branch; and
averaging said mixed signal.

35. The method according to claim 33, characterized in that said first branch of said optical DQPSK receiver is I branch, said second branch is Q branch; the step of adjusting said first branch of said optical DQPSK receiver is of increasing the phase of said interferometer in corresponding branch of said optical DQPSK receiver when the phase error signal with a sign in corresponding branch is positive, and reducing the phase of said interferometer in corresponding branch of said optical DQPSK receiver when the input signal thereof is negative, the step of adjusting said second branch of said optical DQPSK receiver is of reducing the phase of said interferometer in corresponding branch of said optical DQPSK receiver when the phase error signal with a sign in corresponding branch is positive, and increasing the phase of said interferometer in corresponding branch of said optical DQPSK receiver when the input signal is negative.

36. A phase monitor apparatus for optical DQPSK receiver, said optical DQPSK receiver including a first branch and a second branch, and each branch containing a delay interferometer having a phase shift element, an optical detector detecting an optical output of the delay interferometer, and a data recovery circuit recovering data from an output signal of the optical detector, the phase monitor apparatus for monitoring an phase error of the phase shift element of the delay interferometer provided to the first branch, said phase monitor apparatus comprising:
- a first polarity controller controlling polarity of a first signal obtained from a previous stage of a data recovery circuit of the first branch;
- a second polarity controller controlling polarity of a second signal obtained from a subsequent stage of a data recovery circuit of the second branch;
- a mixer multiplying the first signal, the polarity of the first signal being controlled by said first polarity controller, with the second signal, the polarity of the second signal being controlled by said second polarity controller;
- an averaging circuit averaging an output signal of said mixer; and
- a calculator to calculate the phase error based on a plurality of values obtained from said averaging circuit in accordance with a combination of polarities of the first and second signals.

37. The phase monitor apparatus according to claim 36, wherein
said calculator calculates the phase error based on a first value obtained from said averaging circuit when the first signal is controlled to be a first polarity and the second signal is controlled to be the first polarity, a second value obtained from said averaging circuit when the first signal is controlled to be a second polarity and the second signal is controlled to be the first polarity, a third value obtained from said averaging circuit when the first signal is controlled to be the second polarity and the second signal is controlled to be the second polarity, and a fourth value obtained from said averaging circuit when the first signal is controlled to be the first polarity and the second signal is controlled to be the second polarity.

38. The phase monitor apparatus according to claim 37, wherein
said calculator outputs a result of a subtraction of the second value and the fourth value from the sum of the first value and the third value as the phase error.

39. A phase monitor method for an optical DQPSK receiver in an optical DQPSK receiver comprising a first branch and a second branch, each of which has a delay interferometer having a phase shift element, an optical detector detecting an optical output of the delay interferometer, and a data recovery circuit recovering data from an output signal of the optical detector, for monitoring an phase error of the phase shift element of the delay interferometer provided to the first branch, comprising:
- controlling polarities of a first signal obtained from a previous stage of a data recovery circuit of the first branch and a second signal obtained from a subsequent stage of a data recovery circuit of the second branch;
- multiplying the first signal, the polarity of which being controlled, with the second signal, the polarity of which being controlled;
- averaging a signal obtained by multiplication; and
- calculating the phase error based on a plurality of averaged values obtained in accordance with a combination of polarities of the first and second signals.

* * * * *

UNITED STATES PATENT AND TRADEMARK OFFICE
CERTIFICATE OF CORRECTION

PATENT NO. : 7,877,025 B2
APPLICATION NO. : 11/994649
DATED : January 25, 2011
INVENTOR(S) : Zhenning Tao et al.

It is certified that error appears in the above-identified patent and that said Letters Patent is hereby corrected as shown below:

Column 22, Line 63, In Claim 24, after "to" delete "any one of".

Column 23, Line 7, In Claim 25, after "to" delete "any one of".

Signed and Sealed this
Third Day of May, 2011

David J. Kappos
*Director of the United States Patent and Trademark Office*